United States Patent
Nishino

(10) Patent No.: US 8,092,181 B2
(45) Date of Patent: Jan. 10, 2012

(54) RESIN CROSS FLOW FAN AND MANUFACTURING METHOD THEREOF

(75) Inventor: Hisanori Nishino, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 1014 days.

(21) Appl. No.: 11/997,724

(22) PCT Filed: Aug. 1, 2006

(86) PCT No.: PCT/JP2006/315202
§ 371 (c)(1),
(2), (4) Date: Feb. 1, 2008

(87) PCT Pub. No.: WO2007/018075
PCT Pub. Date: Feb. 15, 2007

(65) Prior Publication Data
US 2010/0158689 A1    Jun. 24, 2010

(51) Int. Cl.
*F01D 5/22* (2006.01)
(52) U.S. Cl. ........ 416/178; 416/184; 416/187; 416/199; 416/200 R; 416/241 R; 29/889.4
(58) Field of Classification Search .................. 416/178, 416/184, 187, 199, 200 R, 241 R; 29/889, 29/889.4
See application file for complete search history.

(56) References Cited

U.S. PATENT DOCUMENTS

| | | | | |
|---|---|---|---|---|
| 3,262,637 A | * | 7/1966 | Sprouse et al. | 416/178 |
| 3,737,966 A | * | 6/1973 | Ranz | 29/889.4 |
| 4,041,593 A | * | 8/1977 | Wallman | 29/889.4 |
| 4,079,488 A | * | 3/1978 | Yuda | 29/23.51 |
| 4,838,762 A | * | 6/1989 | Savage et al. | 416/187 |
| 5,165,855 A | * | 11/1992 | Ricketts et al. | 416/178 |
| 5,476,365 A | * | 12/1995 | Kobayashi | 416/178 |
| 5,827,046 A | * | 10/1998 | Konno et al. | 416/178 |
| 6,416,285 B1 | * | 7/2002 | Fichter | 416/178 |

FOREIGN PATENT DOCUMENTS

| | | |
|---|---|---|
| AU | 716 795 B2 | 3/2000 |
| EP | 1 688 623 A1 | 8/2006 |
| JP | 58-004793 | 7/1983 |
| JP | 10-009189 A | 1/1998 |
| JP | 10-196584 A | 7/1998 |
| JP | 2001-105500 A | 4/2001 |
| JP | 2002-266788 A | 9/2002 |

OTHER PUBLICATIONS

EP Search Report of corresponding EP Application No. 06 78 2080.3 dated Jun. 17, 2011.

* cited by examiner

*Primary Examiner* — Igor Kershteyn
(74) *Attorney, Agent, or Firm* — Global IP Counselors

(57) ABSTRACT

A resin cross flow fan and a method for manufacturing a resin cross flow fan are provided in which an annealing step can be omitted and the number of circular disks can be reduced, and which provides improved fan strength and air blowing performance. A resin cross flow fan is disposed with a plurality of blades and a plurality of plates. The plurality of blades are annually disposed about a rotation axis. Insertion portions each constituted by a hole or a groove into which each blade is inserted and projecting portions that projects from the periphery of the insertion portions in a direction of the rotation axis are formed on each of the plurality of plates disposed spaced apart in the direction of the rotation axis. Each blade is fixed to the projecting portions by laser welding.

7 Claims, 23 Drawing Sheets

RESIN CROSS FLOW FAN AND MANUFACTURING METHOD THEREOF

CROSS-REFERENCE TO RELATED APPLICATIONS

This U.S. National stage application claims priority under 35 U.S.C. §119(a) to Japanese Patent Application No. 2005-227700, filed in Japan on Aug. 5, 2005, the entire contents of which are hereby incorporated herein by reference.

BACKGROUND OF THE INVENTION

1. Field of the Invention

The present invention relates to a resin cross flow fan and a manufacturing method thereof.

2. Background Information

As a conventional resin cross flow fan, a fan manufactured by so-called ultrasonic welding is well known in which, as shown in FIG. 1, a resin molded body 211 integrally formed by a circular disk 211a and numerous blades 211b by a mold is provided (resin molding step), subsequently these resin molded bodies 211 are superposed in a direction of a rotation axis of the fan, and then an assembly of these resin molded bodies 211 is subjected to ultrasonic vibration while being pressurized in the direction of the rotation axis: thereby these resin molded bodies 211 are molded to each other (ultrasonic welding step). Here, members disposed at both ends of the assembly of the resin molded bodies 211 shown in FIG. 1 (in FIG. 1, nine resin molded bodies 211 are superposed) in the direction of the rotation axis are resonant bodies called cones 221 and 222 for transmitting vibration energy by ultrasound to the resin molded bodies 211, and a member disposed adjacently to the cone 221 is a vibrator called cylinder 223 for converting an electronic signal from an oscillator (not shown) into vibration energy by ultrasound.

In addition, unlike the above described resin cross flow fan, there have been invented resin cross flow fans manufactured by using long blades that extend the entire length of the fan. As an example of these resin cross flow fans, there is provided a fan manufactured by pressing in and welding long blades that extend the entire length of the fan to circular disks having a plurality of blade insertion grooves formed therein, through these blade insertion grooves coated with solvent, from the direction of the outer circumference of the circular disks (see Japanese Patent Application Publication No. H10-196584).

SUMMARY OF THE INVENTION

With the above described fan manufactured by the method in which the resin molded bodies 211 integrally formed by the circular disk 211a and the blades 211b are superimposed and then welded to each other by ultrasound, as shown in FIG. 1, distortion is caused on the assembly after being subjected to the ultrasonic welding step (see two-dot chain lines A in FIG. 1). Therefore, the whole assembly needs to be annealed after being subjected to ultrasonic welding in order to eliminate such distortion (annealing step; see two-dot chain lines B in FIG. 1). The annealing step is performed for a very long duration. This causes a problem of higher manufacturing cost. In addition, since the resin molded bodies 211 are injection molded by a mold, the length of the blades 211b cannot be lengthened due to restrictions such as a draft angle of the mold and the like. This causes a problem of an increased number of circular disks 211a. This also causes a problem that a structure suitable for improving air blowing performance, such as where the blades 211b are disposed inclined with respect to the rotation axis or the like, cannot be made.

With the above described fan manufactured by pressing in and welding the long blades to the circular disks having the plurality of blade insertion grooves formed therein through these blade insertion grooves coated with solvent from the direction of the outer circumference of the circular disks, the ultrasonic welding step can be omitted: therefore, the annealing step for eliminating distortions caused by ultrasonic welding can be omitted and the number of the circular disks 211a shown in FIG. 1 can be reduced. However, since the blades are fixed to the circular disks by pressing them into the blade insertion grooves and welding by solvent, the blade insertion grooves need to be formed on the circular disks with high dimensional accuracy. When it is not possible to ensure sufficient dimensional accuracy, a gap is created between the blades and the blade insertion grooves. This results in problems such as that the blades are insufficiently pressed in and welded or deformation is caused on the blades and the circular disks, thus impairing fan strength and air blowing performance.

An object of the present invention is to provide a resin cross flow fan and a manufacturing method thereof in which an annealing step can be omitted and the number of circular disks can be reduced, and which provides improved fan strength and air blowing performance.

A resin cross flow fan according to a first aspect of the present invention includes a plurality of blades and a plurality of circular disks. The plurality of blades are annually disposed about a rotation axis. The plurality of circular disks are disposed spaced apart in the direction of the rotation axis, and disposed with insertion portions each constituted by a hole or a groove into which each blade is inserted and projecting portions that project from the periphery of the insertion portions in a direction of the rotation axis. Each blade is fixed to the projecting portions by laser welding.

With this resin cross flow fan, since the projecting portions are disposed at the periphery of the insertion portions of the circular disks, sections are formed where the projecting portions constituting part of the circular disks overlap with the blades when viewing a circumferential space between the blades from the outer circumference of the circular disks. In other words, this resin cross flow fan has a structure in which laser irradiation can be performed in a state in which the blades are inserted into the insertion portions. Further, since this resin cross flow fan is manufactured by inserting the blades into the insertion portions and then welding the blades to the projecting portions by laser welding, it is possible to use long blades and thus the number of circular disks can be reduced. In addition, distortion during welding is reduced and thus an annealing step can be omitted. Further, unlike a fan manufactured by pressing in and welding the blades into the insertion portions of the circular disks, the resin cross flow fan of the present invention can provide improved fan strength and air blowing performance since the blades and the circular disks are not easily deformed.

A resin cross flow fan according to a second aspect of the present invention is the resin cross flow fan according to the first aspect of the present invention, wherein the circular disks further have pressing portions formed thereon for pressing the blades toward the projecting portions in a state in which the blades are inserted into the insertion portions.

With this resin cross flow fan, since the pressing portions are formed on the circular disks, the blades can be closely contacted with the projecting portions simply by inserting the blades into the insertion portions. This eliminates the need for a jig for pressing the blades to the projecting portions when performing laser welding, and each blade can be reliably welded.

A resin cross flow fan according to a third aspect of the present invention is the resin cross flow fan according to the second aspect of the present invention, wherein the pressing portions are pawl portions that become elastically deformed such that portions that come into contact with the blades can move closer to or away from the projecting portions.

With this resin cross flow fan, since the pressing portions are the elastically deformable pawl portions, the portions that come into contact with the blades move away from the projecting portions. Thereby, an insertion movement of the blades into the insertion portions is not easily interfered. This enables smooth insertion of the blades into the insertion portions.

A resin cross flow fan according to a fourth aspect of the present invention is the resin cross flow fan according to any one of the first through third aspects of the present invention, wherein a material constituting the circular disks has a higher light transmittance than a material constituting the blades.

With this resin cross flow fan, since the material constituting the circular disks has a higher light transmittance than the material constituting the blades, laser welding of the blades to the projecting portion can be easily performed from the direction of the projecting portions.

A resin cross flow fan according to a fifth aspect of the present invention is the resin cross flow fan according to any one of the first through fourth aspects of the present invention, wherein the projecting portions are formed so as to extend along one side of the blades.

With this resin cross flow fan, since the projecting portions are formed so as to extend along one side of the blades, it is possible to reduce the number of portions to be laser welded.

A manufacturing method of a resin cross flow fan according to a sixth aspect of the present invention includes a providing step, an assembling step, and a welding step. In the providing step, a plurality of blades and a plurality of circular disks are provided, with the plurality of circular disks disposed with insertion portions each constituted by a hole or groove into which each blade is inserted and projecting portions that project from the periphery of the insertion portions in a through thickness direction. In the assembling step, the plurality of blades are assembled onto the plurality of circular disks by inserting the blades into the insertion portions. In the welding step, the blades are fixed to the projecting portions by laser welding.

With this manufacturing method of a resin cross flow fan, the projecting portions are disposed at the periphery of the insertion portions of the circular disks. Therefore, in the assembling step, sections are formed where the projecting portions constituting part of the circular disks overlap with the blades when viewing a circumferential space between the blades from the outer circumference of the circular disks. In other words, with this manufacturing method, laser irradiation can be performed in a state in which the blades are inserted into the insertion portions. Further, since the long blades can be used in a resin cross flow fan manufactured by this manufacturing method, the number of circular disks can be reduced. In addition, distortion during welding is reduced and thus the annealing step can be omitted. Further, unlike a fan manufactured by pressing in and welding the blades into the insertion portions of the circular disks, the resin cross flow fan of the present invention can provide improved fan strength and air blowing performance since the blades and circular disks are not easily deformed.

A manufacturing method of a resin cross flow fan according to a seventh aspect of the present invention is the manufacturing method of a resin cross flow fan according to the sixth aspect of the present invention, wherein the circular disks further have pressing portions formed thereon for pressing the blades toward the projecting portions in a state in which the blades are inserted into the insertion portions. In the assembling step, the blades are inserted into the insertion portions and thereby the blades are pressed toward the projecting portions.

With this manufacturing method of a resin cross flow fan, since the pressing portions are formed on the circular disks, in the assembling step, the blades can be closely contacted with the projecting portions simply by inserting the blades into the insertion portions. This eliminates the need for a jig for pressing the blades toward the projecting portions in the welding step, and each blade can be reliably welded.

A manufacturing method of a resin cross flow fan according to an eighth aspect of the present invention is the manufacturing method of a resin cross flow fan according to the sixth or seventh aspect of the present invention, wherein the projecting portions are formed so as to extend along one side of the blades. In the welding step, one side of the blades is subjected to laser welding.

With this manufacturing method of a resin cross flow fan, since the projecting portions are formed so as to extend along one side of the blades and only one side of the blades is welded to the circular disks in the welding step, it is possible to reduce the number of portions to be laser welded.

DETAILED DESCRIPTION OF THE PREFERRED EMBODIMENTS

Embodiments of a resin cross flow fan and a manufacturing method thereof according to the present invention are described below with reference to the drawings.

First Embodiment

(1) Structure of a Resin Cross Flow Fan

Figure 1:
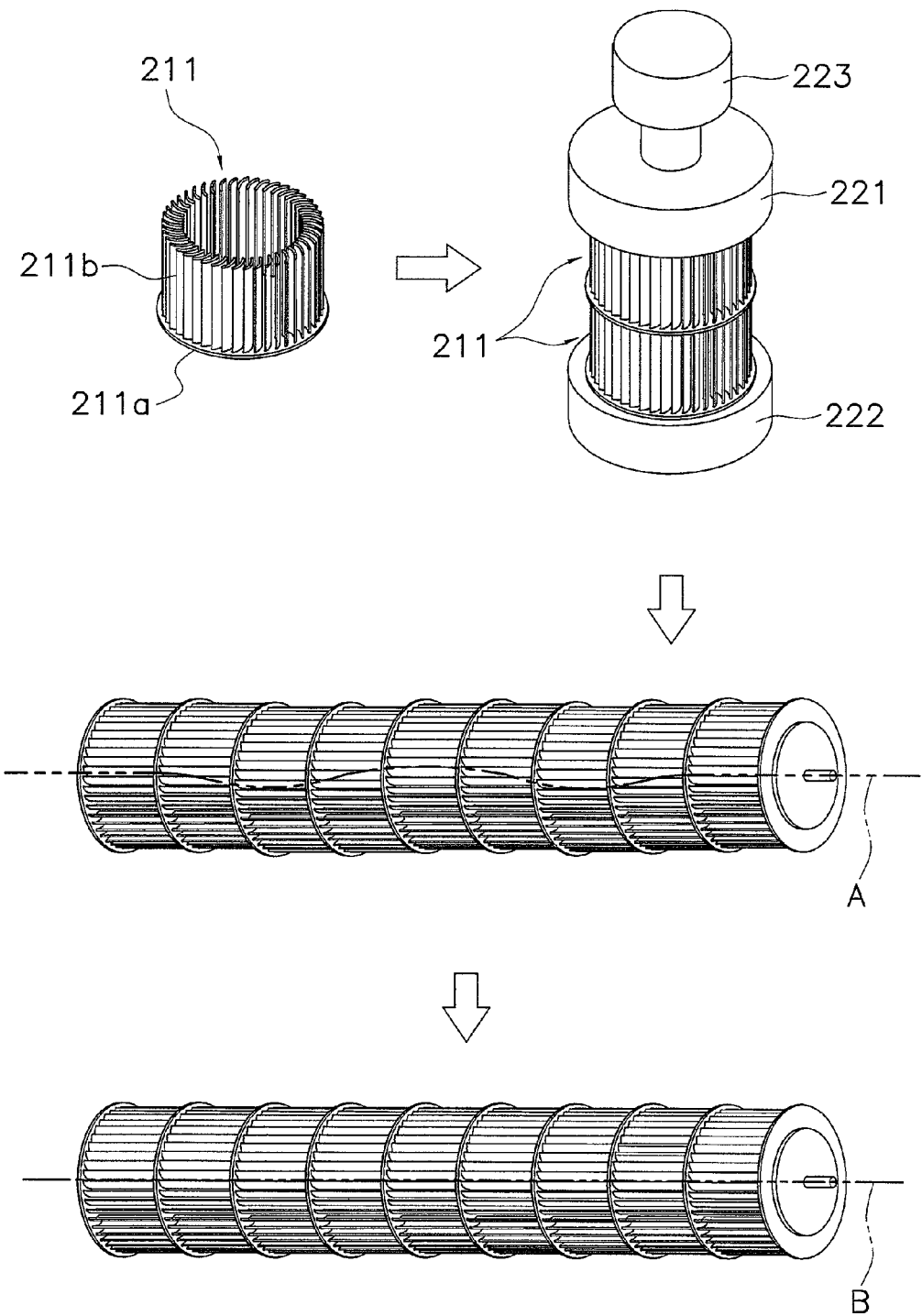
FIG. 1 is a view of an assembling step of a conventional resin cross flow fan.
Figure 2:
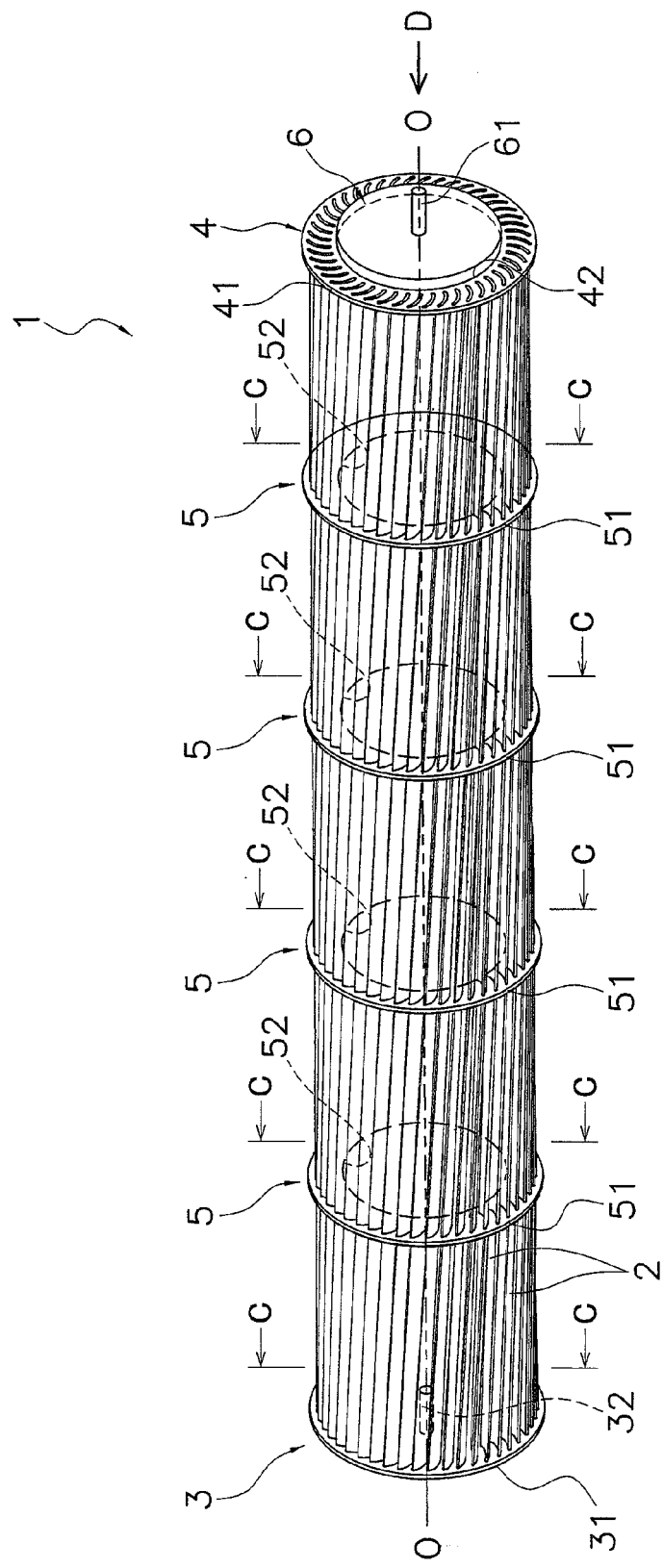
FIG. 2 is an external perspective view of a resin cross flow fan according to a first embodiment of the present invention.

FIG. 2 shows an external perspective view of a resin cross flow fan 1 according to a first embodiment of the present invention. Note that line O-O is a rotation axis line of the resin cross flow fan 1 (hereinafter line O-O is referred to as "rotation axis").

The resin cross flow fan 1 mainly includes a plurality of blades 2, a first end plate 3, a second end plate 4, and support plates 5.

The plurality of blades 2 are long resin members annually disposed about the rotation axis and extending the entire length of the resin cross flow fan 1. Each blade 2 has a cross section having a generally circular arc shape. In addition, each blade 2 is disposed inclined at predetermined angle instead of in parallel to the rotation axis, in order to improve air blowing performance including noise reduction and the like. In addition, an ABS resin and the like may be used as the material constituting the blades 2.

Figure 3:
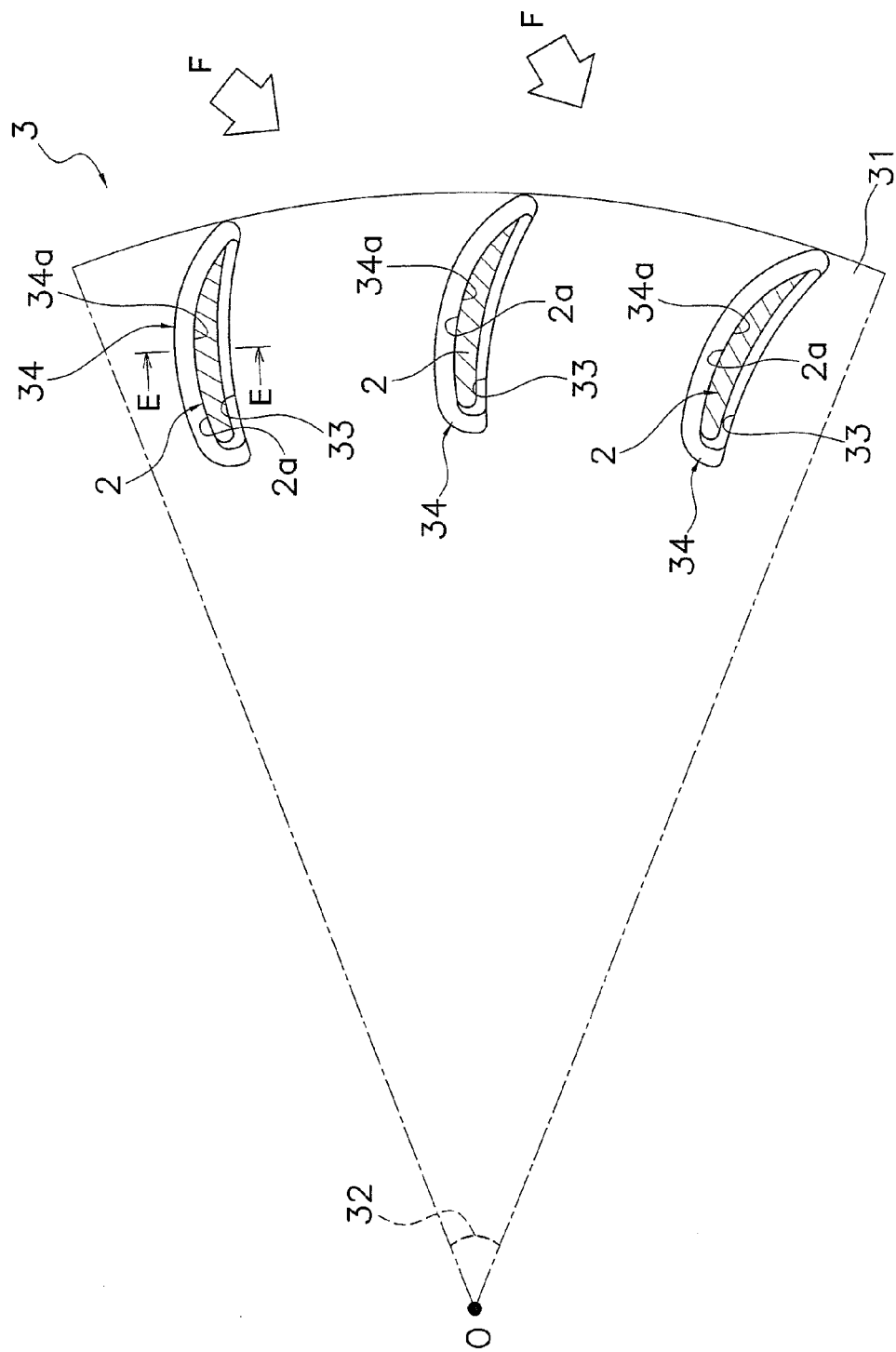
FIG. 3 is a cross sectional view taken along line C-C in FIG. 2 and is an enlarged view of only a portion of a first end plate of the resin cross flow fan according to the first embodiment.
Figure 4:
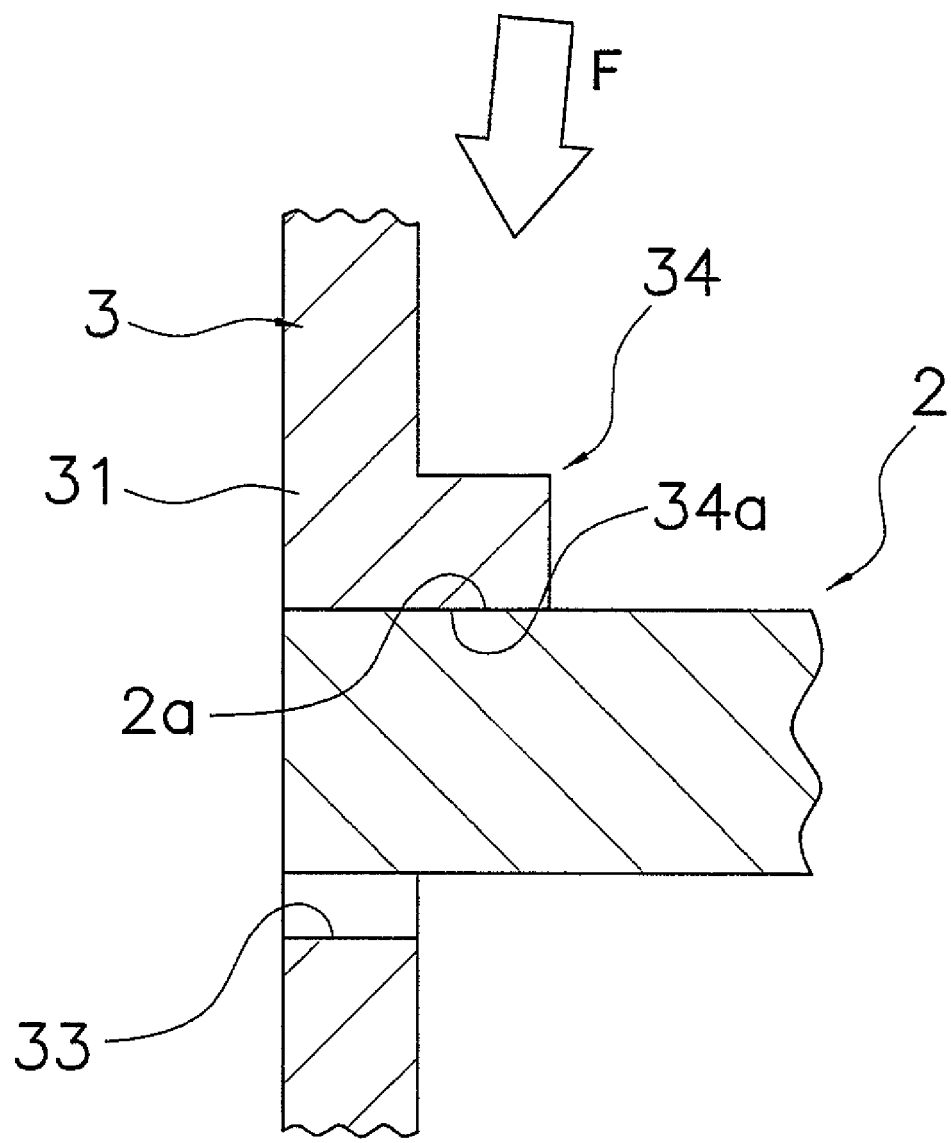
FIG. 4 is a cross sectional view taken along line E-E in FIG. 3.

The first end plate 3 is a member constituting an end of the resin cross flow fan 1 in a longitudinal direction, and mainly includes a resin plate portion 31 having a circular disk shape and an axial portion 32 disposed at the center of the plate portion 31. As shown in FIGS. 3 and 4, the plate portion 31 has a plurality of insertion portions 33 formed therein into which the plurality of blades 2 are inserted respectively, for supporting an end of the plurality of blades 2 in a longitudinal direction. The insertion portions 33 are through holes having a shape that corresponds to each blade 2. The insertion portions 33 have a hole size slightly larger than the cross sectional size of the blades 2. In addition, the plate portion 31 has projecting portions 34 formed thereon which project from the periphery of each insertion portion 33 in the direction of the rotational axis (specifically, toward the support plates 5). Each projecting portion 34 is formed so as to surround a convex portion of the periphery of the circular arc shaped blade 2 and both end portions of the same in a circumferential direction. Further, each projecting portion 34 includes a welding surface 34a that extends along the convex portion (hereinafter referred to as "welding surface 2a") of the periphery of the blade 2, i.e. a surface facing the projecting portion 34. Since these projecting portions 34 as described above are formed, the projecting portions 34 as part of the first end plate 3 and the blades 2 are in a state where the projecting portions 34 as part of the first end plate 3 overlap with the blades 2 when viewing a circumferential space between the blades 2 from the outer circumference of the first end plate 3 (see arrows F in FIGS. 3 and 4). Further, the plurality of blades 2 (specifically, the welding surfaces 2a) are fixed to these projecting portions 34 (specifically, the welding surfaces 34a) by laser welding. More specifically, the portions where the projecting portions 34 overlap with the blades 2 when viewing the circumferential space between the blades 2 are irradiated with a laser in the direction from the outer circumference of the first end plate 3 to the projecting portions 34, and thereby the welding surfaces 34a of the projecting portions 34 are welded to the welding surfaces 2a of the blades 2 (see arrows F in FIGS. 3 and 4). Further, when laser welding is applied as a welding method, as the material constituting the first end plate 3, it is preferable to use a material having a higher light transmittance than the material constituting the blades 2. For example, it is conceivable that a color such as transparent, white, or neutral (for example, milky-white) is used for the first end plate 3, and a color such as black is used for the blades 2. In addition, an ABS resin and the like may be used as the material constituting the first end plate 3. Note that FIG. 3 is a cross sectional view taken along line C-C in FIG. 2 and is an enlarged view of only a portion of the first end plate 3. FIG. 4 is a cross sectional view taken along line E-E in FIG. 3.

Figure 5:
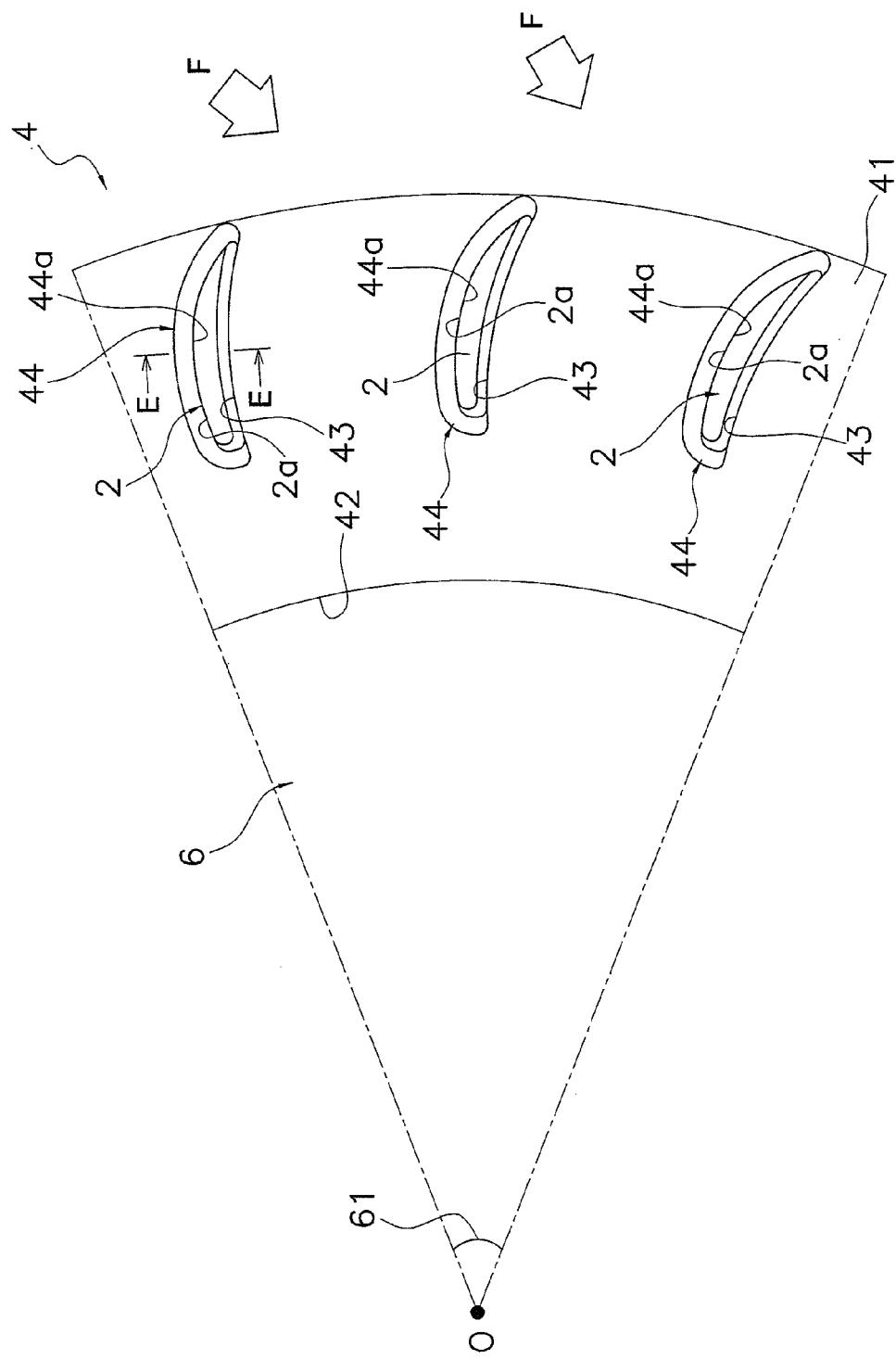
FIG. 5 is a view along arrow D in FIG. 2 and is an enlarged view of only a portion of a second end plate of the resin cross flow fan according to the first embodiment.
Figure 6:
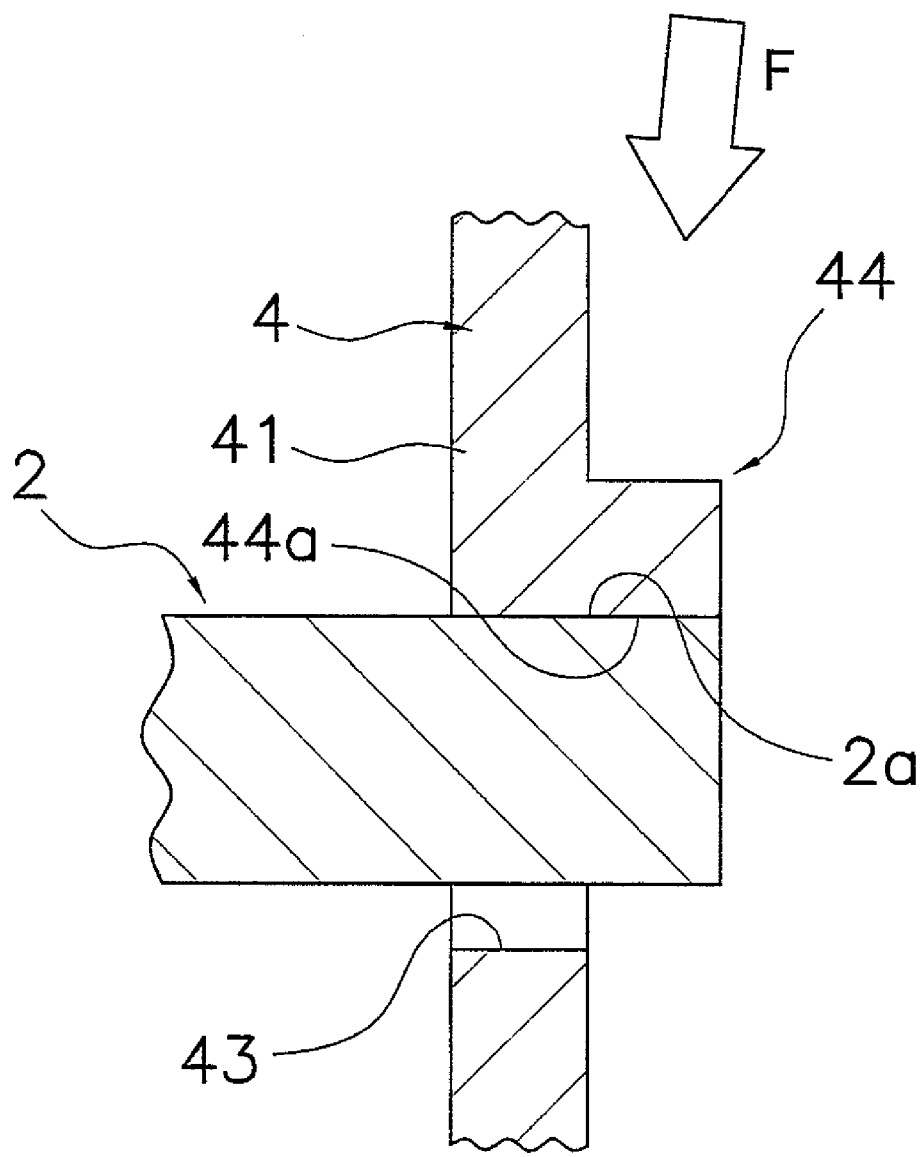
FIG. 6 is a cross sectional view taken along line E-E in FIG. 5.

The second end plate 4 is a member that constitutes the other end of the resin cross flow fan 1 in the longitudinal direction (an end portion on the side opposite from the first end plate 3), and mainly includes a resin plate portion 41 having a circular disk shape. A circular opening 42 is formed in the plate portion 41 inside of the inner circumference of the plurality of blades 2. A boss 6 having an axial portion 61 is fixed to the plate portion 41 so as to cover the opening 42. In addition, as is the case with the plate portion 31 of the first end plate 3, as shown in FIGS. 5 and 6, a plurality of insertion portions 43 into which the plurality of blades 2 are inserted respectively are formed in the plate portion 41, for supporting other end of the plurality of blades 2 in the longitudinal direction. The insertion portions 43 are through holes having a shape that corresponds to each blade 2. The insertion portions 43 have a hole size slightly larger than the cross sectional size of the blades 2. In addition, the plate portion 41 has projecting portions 44 formed thereon which project from the periphery of each insertion portion 43 in the direction of the rotational axis (specifically, toward the axial portion 61). As is the case with the projecting portions 34 of the first end plate 3, each projecting portion 44 is formed so as to surround the convex portion of the periphery of the circular arc shaped blade 2 and both end portions of the same in the circumferential direction. Further, each projecting portion 44 includes a welding surface 44a that extends along the welding surface 2a of the blade 2. Since the projecting portions 44 as described above is formed, the projecting portions 44 as part of the second end plate 4 and the blades 2 are in a state where the projecting portions 44 as part of the second end plate 4 overlap with the blades 2 when viewing the circumferential space between the blades 2 from the outer circumference of the second end plate 4 (see arrows F in FIGS. 5 and 6). Further, the plurality of blades 2 (specifically, the welding surfaces 2a) are fixed to these projecting portions 44 (specifically, the welding surfaces 44a) by laser welding. More specifically, the portions where the projecting portions 44 overlap with the blades 2 when viewing the circumferential space between the blades 2 are irradiated with a laser in the direction from the outer circumference of the second end plate 4 to the projecting portion 44, and thereby the welding surfaces 44a of the projecting portions 44 are welded to the welding surfaces 2a of the blades 2 (see arrows F in FIGS. 5 and 6). Further, when laser welding is applied as a welding method, as the material constituting the second end plate 4, it is preferable to use a material having a higher light transmittance than the material constituting the blades 2, as is the case with the first end plate 3. For example, it is conceivable that a color such as transparent, white, or neutral (for example, milky-white) is used for the second end plate 4, and a color such as black is used for the blades 2. In addition, an ABS resin and the like may be used as the material constituting the second end plate 4. Note that FIG. 5 is a view along arrow D in FIG. 2 and is an enlarged view of only a portion of the second end plate 4. FIG. 6 is a cross sectional view taken along line E-E in FIG. 5.

Figure 7:
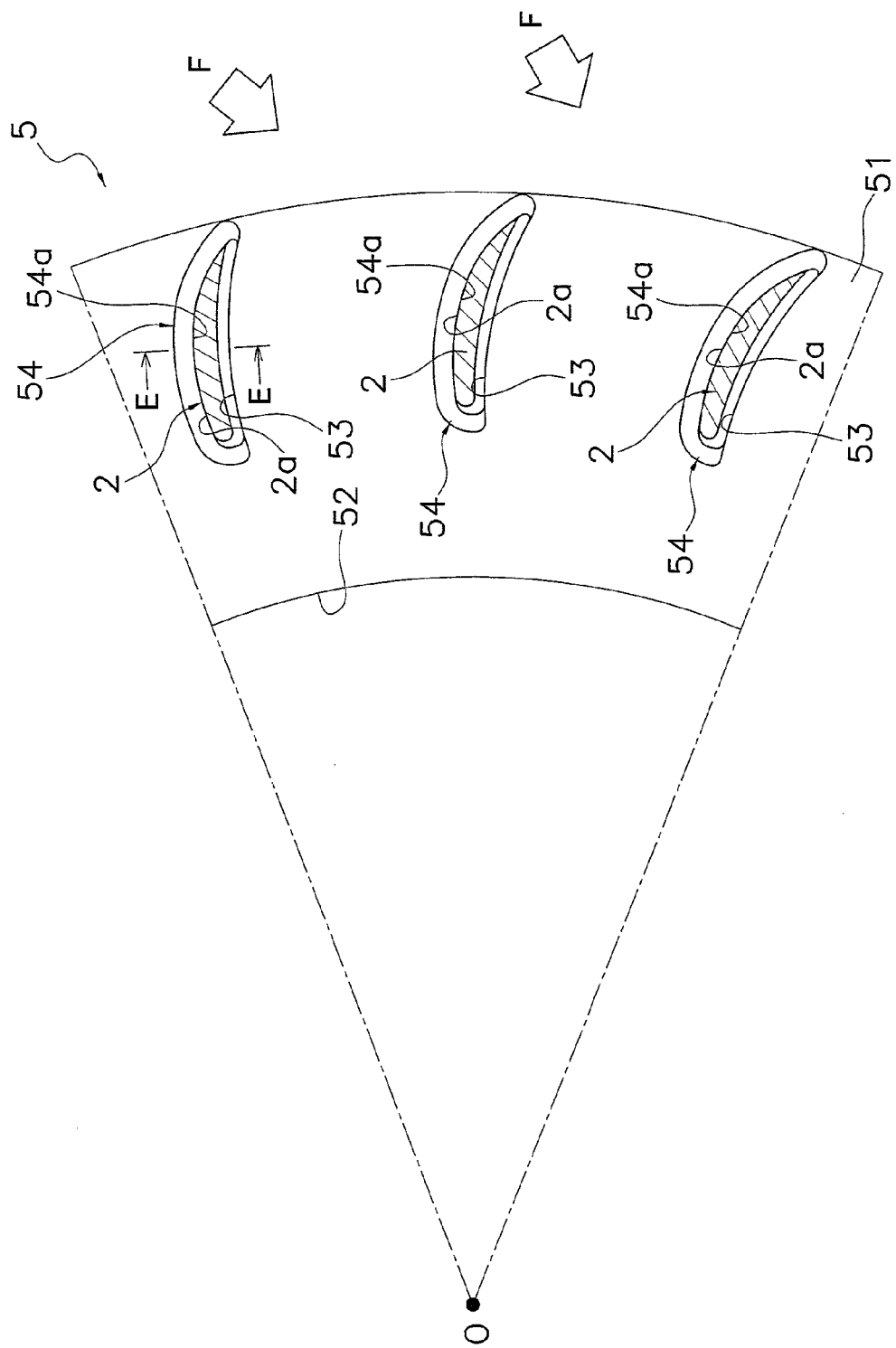
FIG. 7 is a cross sectional view taken along line C-C in FIG. 2 and is an enlarged view of only a portion of a support plate of the resin cross flow fan according to the first embodiment.
Figure 8:
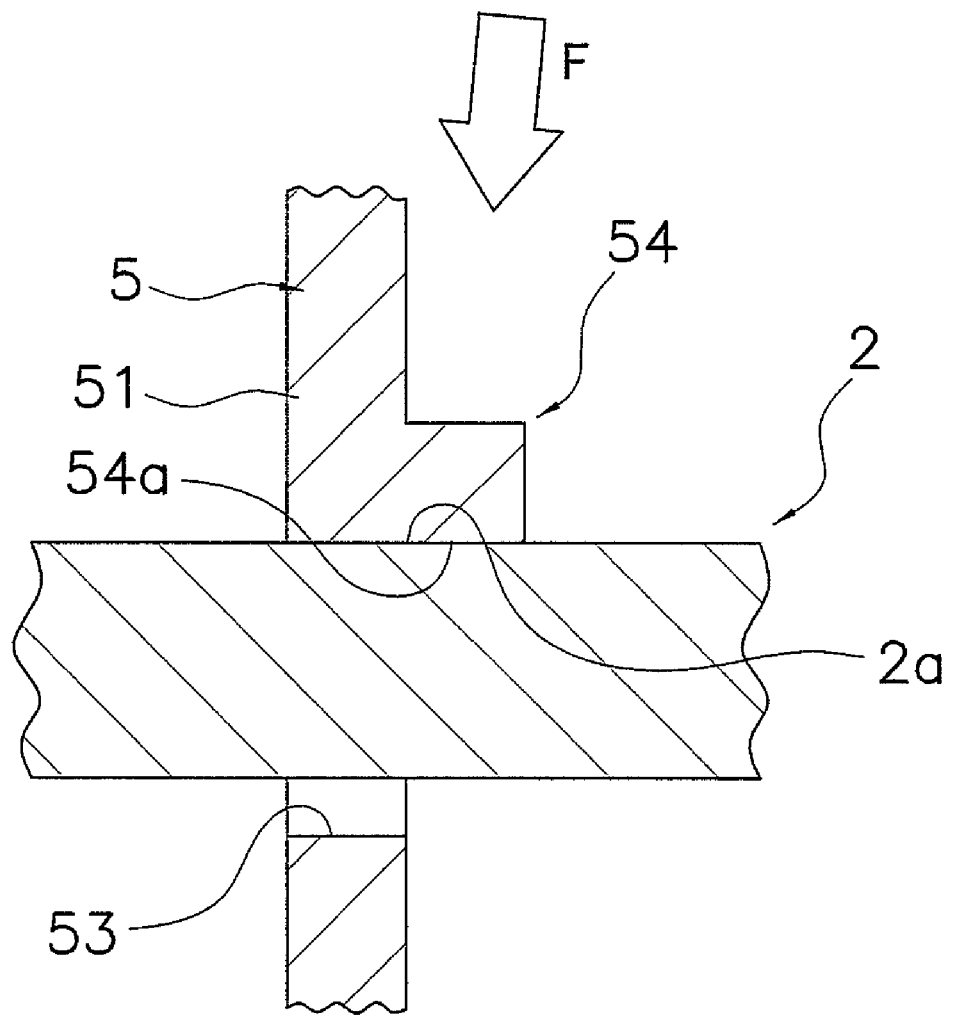
FIG. 8 is a cross sectional view taken along line E-E in FIG. 7.

The support plate 5 is a member that constitutes a middle portion of the resin cross flow fan 1 in the longitudinal direction. Here, four support plates 5 are disposed spaced apart between the first end plate 3 and the second end plate 4. Each support plate 5 mainly includes a resin plate portion 51 having a circular disk shape. A circular opening 52 is formed in the plate portion 51 inside of the inner circumference of the plurality of blades 2. In addition, as is the case with the plate portion 31 of the first end plate 3, as shown in FIGS. 7 and 8, a plurality of insertion portions 53 into which the plurality of blades 2 are inserted respectively are formed in the plate portion 51, for supporting other end of the plurality of blades 2 in the longitudinal direction. The insertion portions 53 are through holes having a shape that corresponds to each blade 2. The insertion portions 53 have a hole size slightly larger than the cross sectional size of the blades 2. In addition, the plate portion 51 has projecting portions 54 formed thereon which project from the periphery of each insertion portion 53 in the direction of the rotational axis (specifically, toward the second end plate 4). As is the case with the projecting portions 34 of the first end plate 3, each projecting portion 54 is formed so as to surround the convex portion of the periphery of the circular arc shaped blades 2 and both end portions of the same in the circumferential direction. Further, each projecting portion 54 includes a welding surface 54a that extends along the welding surface 2a of the b lade 2. Since the projecting portion 54 as described above is formed, the projecting portions 54 as part of the support plates 5 and the blades 2 are in a state where the projecting portions 54 as part of the support plates 5 overlap with the blades 2 when viewing the circumferential space between the blades 2 from an outer circumference of the support plates 5 (see arrows F in FIGS. 7 and 8). Further, the plurality of blades 2 (specifically, the welding surfaces 2a) are fixed to these projecting portions 54 (specifically, the welding surfaces 54a) by laser welding. More specifically, the portions where the projecting portions 54 overlap with the blades 2 when viewing the circumferential space between the blades 2 are irradiated with a laser in the direction from the outer circumference of each support plate 5 to the projecting portions 54, and thereby the welding surfaces 54a of the projecting portions 54 are welded to the welding surfaces 2a of the blades 2 (see arrows F in FIGS. 7 and 8). Further, when laser welding is applied as a welding method, as the material constituting the support plates 5, it is preferable to use a material having a higher light transmittance than the material constituting the blades 2, as is the case with the first end plate 3. For example, it is conceivable that a color such as transparent, white, or neutral (for example, milky-white) is used for the support plates 5, and a color such as black is used for the blades 2. In addition, an ABS resin and the like may be used as the material constituting the support plates 5. Note that FIG. 7 is a cross sectional view taken along line C-C in FIG. 2 and is an enlarged view of only a portion of the support plates 5. FIG. 8 is a cross sectional view taken along line E-E in FIG. 7.

As described above, the resin cross flow fan 1 is a fan that uses the plurality of long blades 2 that extend the entire length of the resin cross flow fan 1. The resin cross flow fan 1 has a structure in which the plates 3, 4, and 5 serving as the plurality of circular disks are disposed spaced apart in the direction of the rotational axis; the blades 2 are inserted into the insertion portions 33, 43, and 53 each constituted by a hole formed in these plates 3, 4, and 5; and further, a laser is irradiated in the direction from the outer circumference of the plates 3, 4, and 5 to the projecting portions 34, 44, and 54 formed on the plates 3, 4, and 5 so as to project from the periphery of the insertion portions 33, 43, and 53 in the direction of the rotational axis: thereby the blades 2 are welded and fixed to the projecting portions 34, 44, and 54.

(2) Manufacturing Method of Resin Cross Flow Fan

Figure 9:
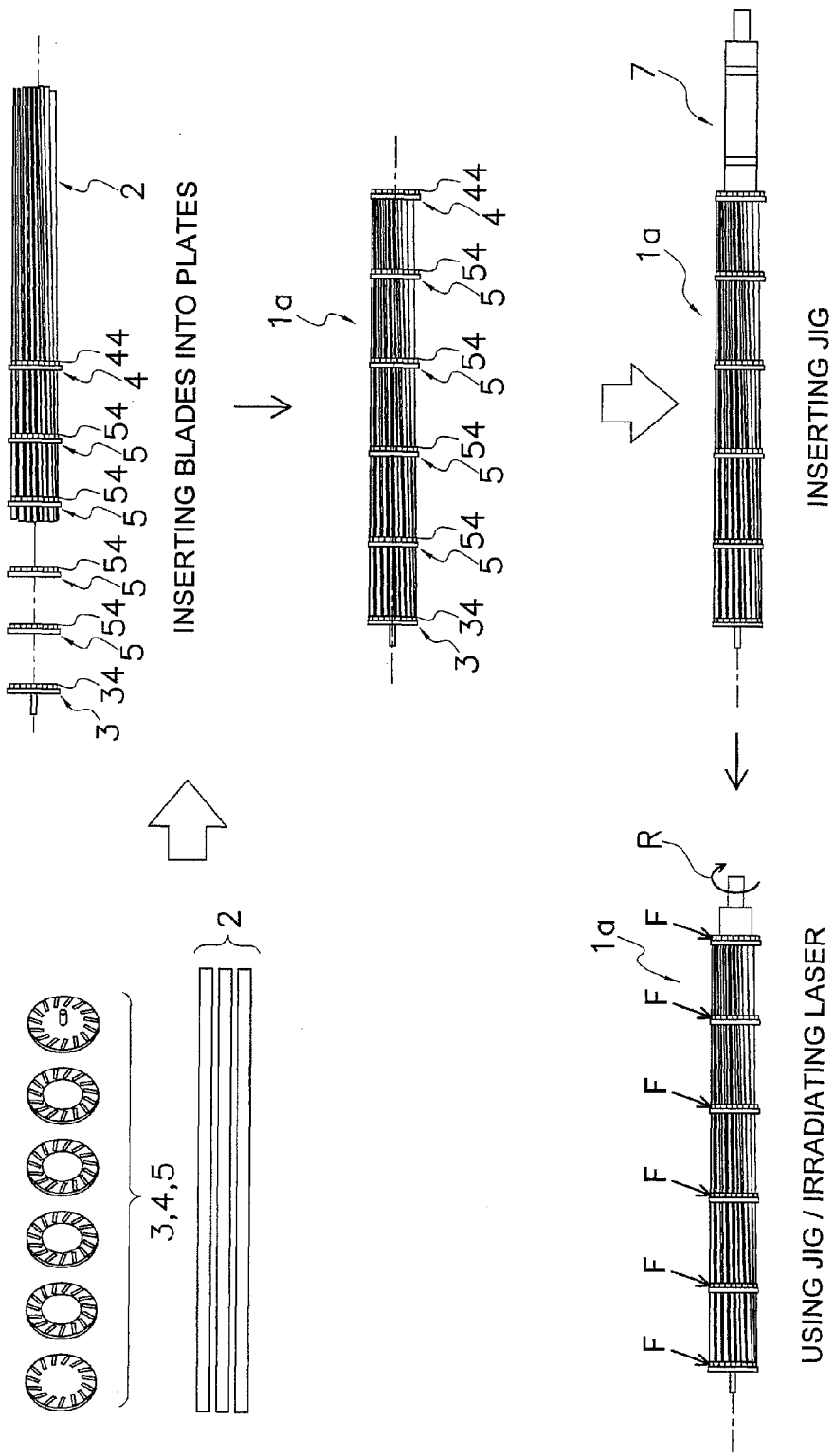
FIG. 9 is a view of a manufacturing step of the resin cross flow fan according to the first embodiment.
Figure 10:
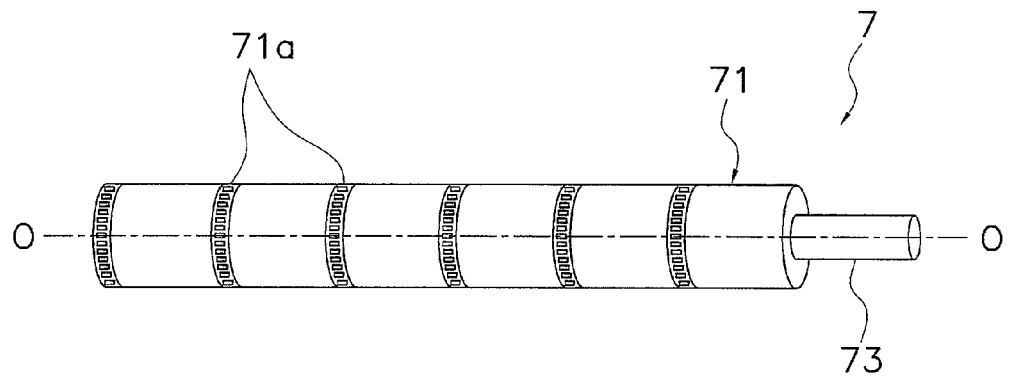
FIG. 10 is a view of a pressing jig used in a welding step.
Figure 11:
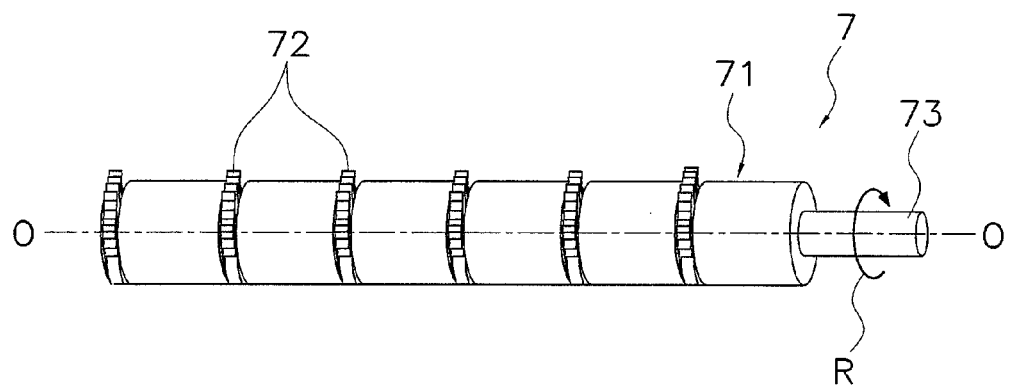
FIG. 11 is a view of the pressing jig used in the welding step.

Next, a manufacturing method of the above described resin cross flow fan 1 is described with reference to FIGS. 2 to 11. Here, FIG. 9 is a view of a manufacturing step of the resin cross flow fan 1. FIGS. 10 and 11 are views of a pressing jig 7 used in a welding step.

The manufacturing method of the resin cross flow fan 1 mainly includes a providing step, an assembling step, and the welding step.

The providing step is a step in which the plurality of blades 2 and the plates 3, 4, and 5 serving as the plurality of circular disks are provided. Specifically, the plurality of blades 2 are obtained by a material continuously extruded from an extruder and cutting this extruded material into predetermined length. In addition, the plates 3, 4, and 5 are obtained by injection molding using a mold.

The assembling step is a step in which the plurality of blades 2 are inserted into the insertion portions 33, 43, and 53 of the plates 3, 4, and 5 and thereby the plurality of blades 2 are assembled onto the plates 3, 4, and 5 serving as the plurality of circular disks in order to obtain an assembly 1a before being subjected to laser welding. Specifically, the assembly 1a is obtained by inserting the plurality of blades 2 into the second end plate 4, the plurality of the support plates 5, and the first end plate 3 in that order and disposing each of the plates 3, 4, and 5 with a predetermined space therebetween in the direction of the rotational axis. Since the assembly 1a as described above is obtained, a section is formed where the projecting portions 34, 44, and 54 as part of the plates 3, 4, and 5 overlap with the blades 2 when viewing the circumferential space between the blades 2 from the outer circumference of the plates 3, 4, and 5. Here, since the insertion portions 33 have a hole size slightly larger than the cross sectional size of the blades 2, it is possible to smoothly assemble the blades 2 onto the plates 3, 4, and 5 and to prevent the blades 2 and the plates 3, 4, and 5 from being deformed.

The welding step is a step in which the blades 2 are fixed to the projecting portions 34, 44, and 54 of the plates 3, 4, and 5 by laser welding. Specifically, a laser is irradiated in the direction from the outer circumference of the plates 3, 4, and 5 to the projecting portions 34, 44, and 54 of the assembly 1a, and thereby the welding surfaces 2a of the blades 2 are welded to the welding surfaces 34a, 44a, and 54a of the projecting portions 34, 44, and 54. At this time, in order to obtain a good welding condition between the blades 2 and the projecting portions 34, 44, and 54, when performing laser irradiation, a state in which the welding surfaces 2a of the blades 2 are closely contacted with the welding surfaces 34a, 44a, and 54a of the projecting portions 34, 44, and 54 is achieved before laser irradiation is performed. Further, in this manufacturing method, a state in which the welding surfaces 2a of blades 2 are closely contacted with the welding surfaces 34a, 44a, and 54a of the projecting portions 34, 44, and 54 is achieved by using a pressing jig configured to press the blades 2 inserted into the insertion portions 33, 43, and 53 toward the projecting portions 34, 44, and 54.

A jig that can be used as this type of pressing jig is capable of being inserted into the assembly 1a from the opening 42 of the second end plate 4 and has a structure disposed with a member that extends to the positions of the blades 2 and the projecting portions 34, 44, and 54 in a radial direction so as to press the blades 2 toward the projecting portions 34, 44, and 54, with the jig being inserted into the assembly 1a. Here, a pressing jig 7 shown in FIGS. 9 to 11 is used. The pressing jig 7 mainly includes a cylindrical cylinder 71 and pressing pawls 72 that extend to the positions of the blades 2 and the projecting portions 34, 44, and 54 in the radial direction. The cylinder 71 has an axial length substantially same as that of the assembly 1a. In addition, the cylinder 71 is a hollow cylindrical member having an outside diameter smaller than the radii of the openings 42 and 52 of the plates 4 and 5, and a plurality of holes 71a are formed on its circumferential surface. The holes 71a are formed so as to correspond to the positions of each of the plates 3, 4, and 5 of the assembly 1a in the axial direction, and in addition, each hole 71a is formed so as to correspond to a circumferential space between the blades 2. The pressing pawls 72 are disposed so as to correspond to the holes 71a and configured to extend from the holes 71a toward the outer circumference of the cylinder 71 as a result of rotation of an axial portion 73 disposed at one end of the cylinder 71 in the axial direction in a direction of arrow R.

Further, in this manufacturing method, a laser is irradiated in the direction from the outer circumference of the plates 3, 4, and 5 to the projecting portions 34, 44, and 54 of the assembly 1a after the welding surfaces 2a of the blades 2 are closely contacted with the welding surfaces 34a, 44a, and 54a of the projecting portions 34, 44, and 54 by inserting the pressing jig 7 into the assembly 1a from the opening 42 of the second end plate 4; rotating the axial portion 73 in the direction of arrow R so as to extend the pressing pawls 72 to the positions of the blades 2 and the projecting portions 34, 44, and 54 in the radial direction; and pressing the concave portion of the blades 2 (i.e., a surface on the side opposite from the welding surface 2a) toward the projecting portions 34, 44, and 54 by the pressing pawl 72. Here, as the material constituting the plates 3, 4, and 5, a material having a higher light transmittance than the material constituting the blades 2 is used. Therefore, laser welding of the blades 2 to the projecting portions 34, 44, and 54 can be easily performed from the direction of the projecting portions 34, 44, and 54. In addition, in this manufacturing method, just one side (i.e., the welding surfaces 2a constituting the convex portions of the blades 2) of the blades 2 is welded to the projecting portions 34, 44, and 54 on the circular disks. Therefore, it is possible to reduce the number of portions to be laser welded. Further, by rotating the assembly 1a, a laser can be sequentially irradiated to the projecting portions 34, 44, and 54 juxtaposed in the circumferential direction of the plates 3, 4, and 5. Therefore, it is possible to improve the operation efficiency in laser welding.

Further, after the welding step, a boss 6 is fixed to the second end plate 4, the radial run-out of axis and balance are checked, and the resin cross flow fan 1 is completed.

(3) Characteristics of Resin Cross Flow Fan and Manufacturing Method Thereof

The resin cross flow fan 1 and the manufacturing method thereof in this embodiment have the following characteristics.

(A)

With the resin cross flow fan 1 in this embodiment, the projecting portions 34, 44, and 54 are disposed at the periphery of the insertion portions 33, 43, and 53 of the plates 3, 4, and 5 serving as the circular disks, and thereby the sections are formed where the projecting portions 34, 44, and 54 constituting part of the plates 3, 4, and 5 overlap with the blades 2 when viewing the circumferential space between the blades 2 from the outer circumference of the plates 3, 4, and 5. In other words, this resin cross flow fan 1 has a structure in which a laser can be irradiated to the projecting portions 34, 44, and 54 in a state in which the blades 2 are inserted into the insertion portions 33, 43, and 53. Further, since this resin cross flow fan 1 is manufactured by inserting the blades 2 into the insertion portions 33, 43, and 53 in the assembling step and then welding the blades 2 to the projecting portions 34, 44, and 54 by laser welding in the welding step, it is possible to use the long blades, which therefore enables reduction in the number of support plates 5 (which enables reduction in weight). In addition, distortion during welding is reduced and thus the annealing step can be omitted. Further, unlike the fan manufactured by pressing in and welding the blades 2 into the insertion portions 33, 43, and 53 of the plates 3, 4, and 5, the resin cross flow fan 1 can provide improved fan strength and air blowing performance since the blades 2 and the plates 3, 4, and 5 are not easily deformed.

(B)

In addition, with the resin cross flow fan 1 in this embodiment, since the material constituting the plates 3, 4, and 5 has a higher light transmittance than the material constituting the blades 2, laser welding of the blades 2 to the projecting portions 34, 44, and 54 can be easily performed from the direction of the projecting portions 34, 44, and 54.

(C)

In addition, with the resin cross flow fan 1 in this embodiment, the projecting portions 34, 44, and 54 are formed so as to extend along one side of the blades 2, it is possible to reduce the number of portions to be laser welded.

(D)

In addition, since laser welding is used to fix the blades 2 to the plates 3, 4, and 5, the insertion portions 33, 43, and 53 of the plates 3, 4, and 5 may have a hole size slightly larger than the cross sectional size of the blades 2. This enables, in the assembling step, to smoothly assemble the blades 2 onto the plates 3, 4, and 5 and to prevent the blades 2 and the plates 3, 4, and 5 from being deformed.

(E)

In addition, by rotating the assembly 1*a*, a laser can be sequentially irradiated to the projecting portions 34, 44, and 54 juxtaposed in the circumferential direction of the plates 3, 4, and 5. Therefore, it is possible to improve the operation efficiency in laser welding.

(4) Modified Example 1

Figure 12:
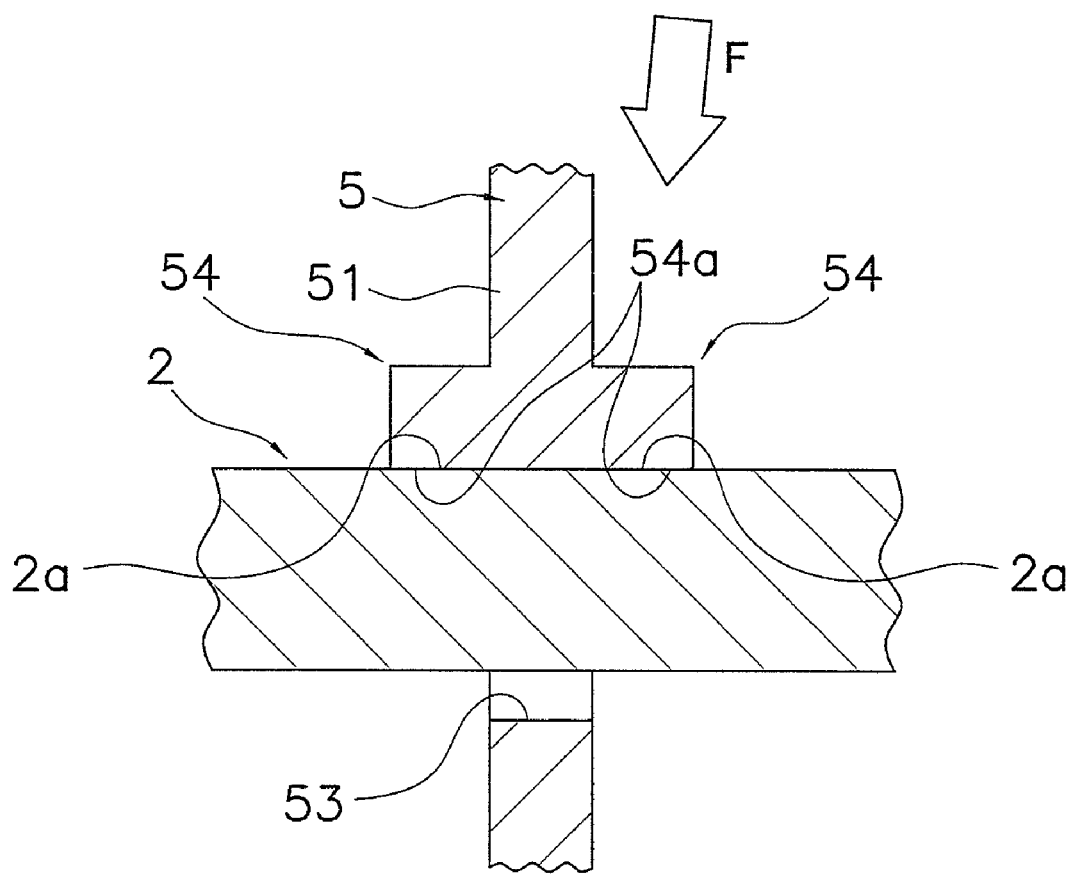
FIG. 12 is a view for describing a resin cross flow fan according to a modified example 1 of the first embodiment and corresponding to FIG. 8.

With the above described resin cross flow fan 1, as shown in FIGS. 4, 6 and 8, the projecting portions 34, 44, and 54 project from the plates 3, 4, and 5 in one direction of the rotational axis (i.e., toward one side). However, the projecting portions 34, 44, and 54 may project from the plates 3, 4, and 5 in both directions of the rotational axis (i.e., toward both sides). More specifically, the support plates 5 are described by way of example (descriptions of the plates 3 and 4 are omitted). As shown in FIG. 12, the projecting portions 54 are formed on each support plate 5 so as to form not only the second end plate 4 but also the first end plate 3, and the blades 2 are laser welded at both sides of each support plate 5. This increases the number of portions to be welded. However, the blades 2 are more securely fixed to the projecting portions 34, 44, and 54.

(5) Modified Example 2

Figure 13:
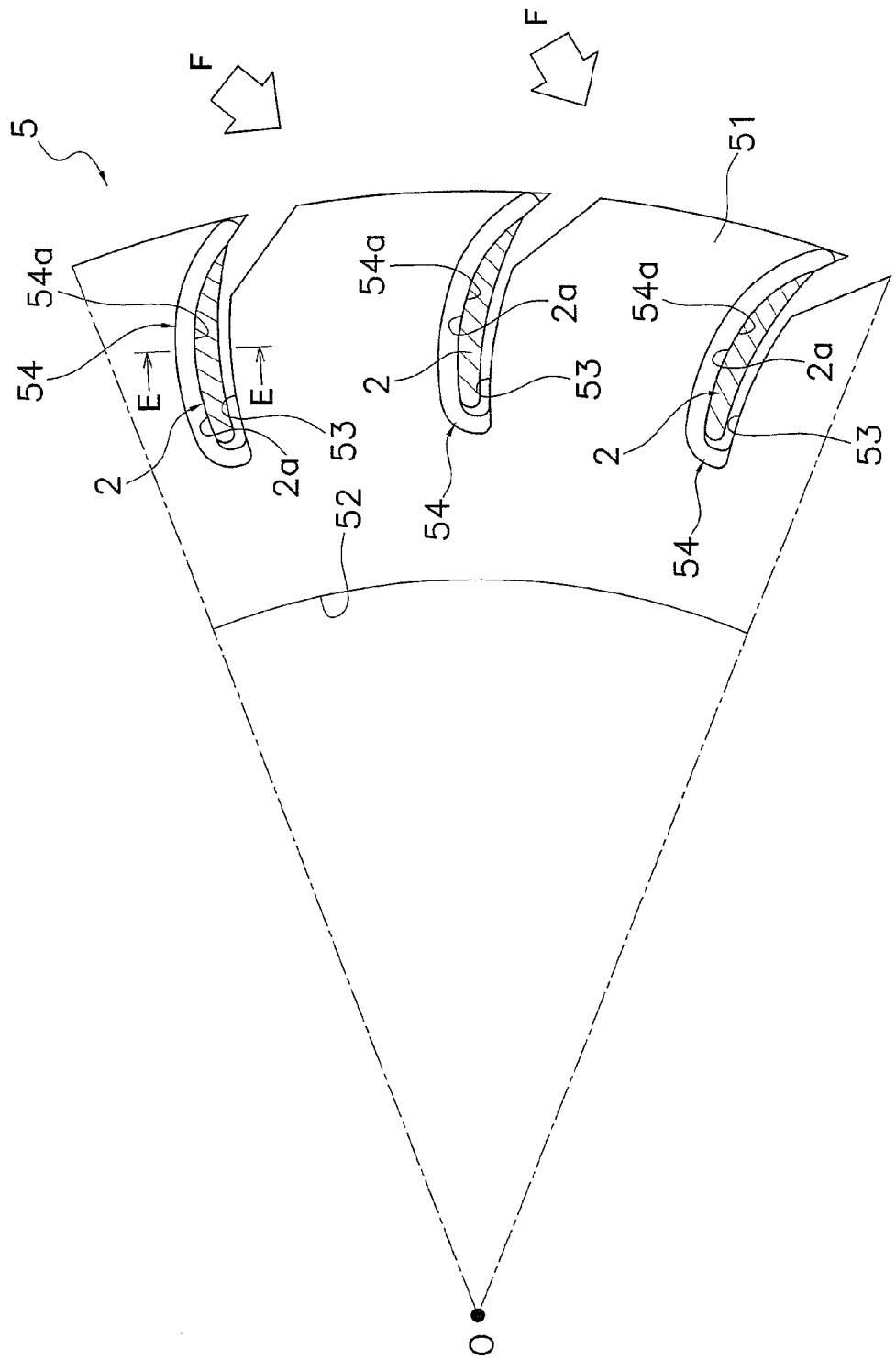
FIG. 13 is a view for describing a resin cross flow fan according to a modified example 2 of the first embodiment and corresponding to FIG. 7.

With the above described resin cross flow fan 1, as shown in FIGS. 3, 5, and 7, the insertion portions 33, 43, and 53 are the through holes. However, the insertion portions 33, 43, and 53 may be cutout grooves that extend to the outer circumferential edge of the plate portions 31, 41, and 51. More specifically, the support plates 5 are described by way of example (descriptions of the plates 3 and 4 are omitted). As shown in FIG. 13, the insertion portions 53 are formed to be cutout grooves that extend to the outer circumferential edge of the plate portion 51. This enables insertion of the blades 2 into the insertion portions 33, 43, and 53 from the outer circumferential edge of the plates 3, 4, and 5.

Second Embodiment (1) Structure of Resin Cross Flow Fan

Figure 14:
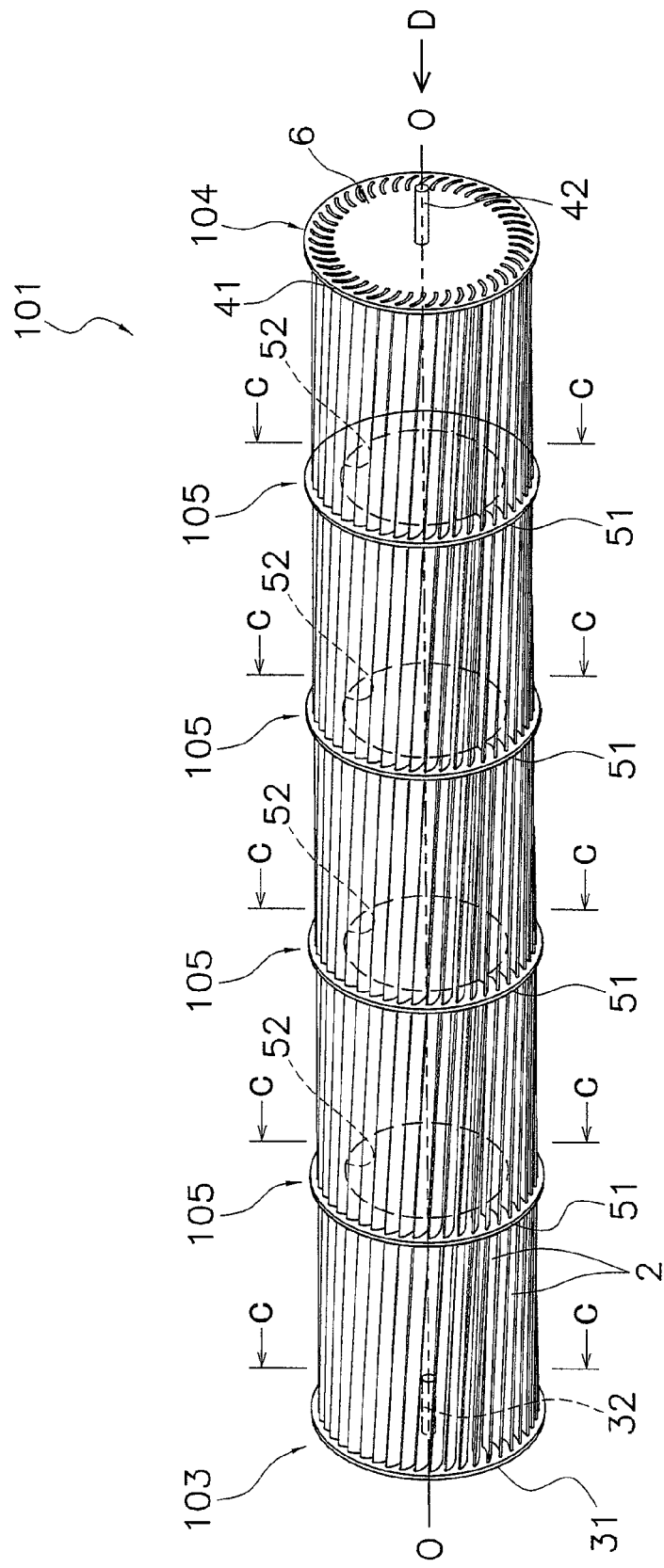
FIG. 14 is an external perspective view of a resin cross flow fan according to a second embodiment of the present invention.

FIG. 14 shows an external perspective view of a resin cross flow fan 101 according to a second embodiment of the present invention. As is the case with the resin cross flow fan 1 in the first embodiment, the resin cross flow fan 101 according to the second embodiment of the present invention is a fan that uses the plurality of long blades 2 that extend the entire length of the resin cross flow fan 101 and mainly includes the plurality of blades 2, a first end plate 103, a second end plate 104, and support plates 105. Note that the resin cross flow fan 101 has a structure similar to that of the resin cross flow fan 1 except for that the plates 103, 104, and 105 are different from the plates 3, 4, and 5 of the resin cross flow fan 1 in the first embodiment. Therefore, descriptions are given below with respect to the structures of the plates 103, 104, and 105.

Figure 15:
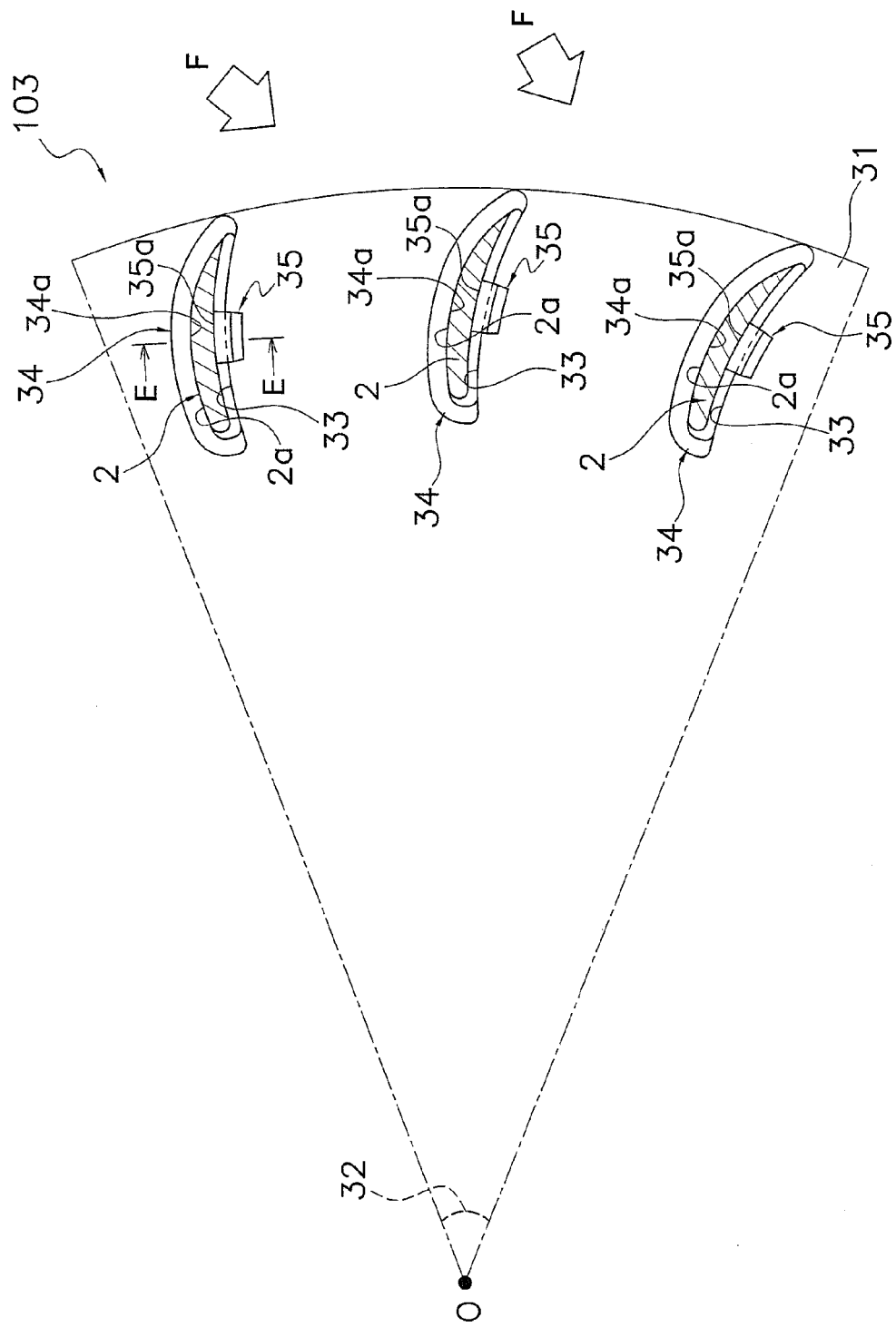
FIG. 15 is a cross sectional view taken along line C-C in FIG. 14 and is an enlarged view of only a portion of a first end plate of the resin cross flow fan according to the second embodiment.
Figure 16:
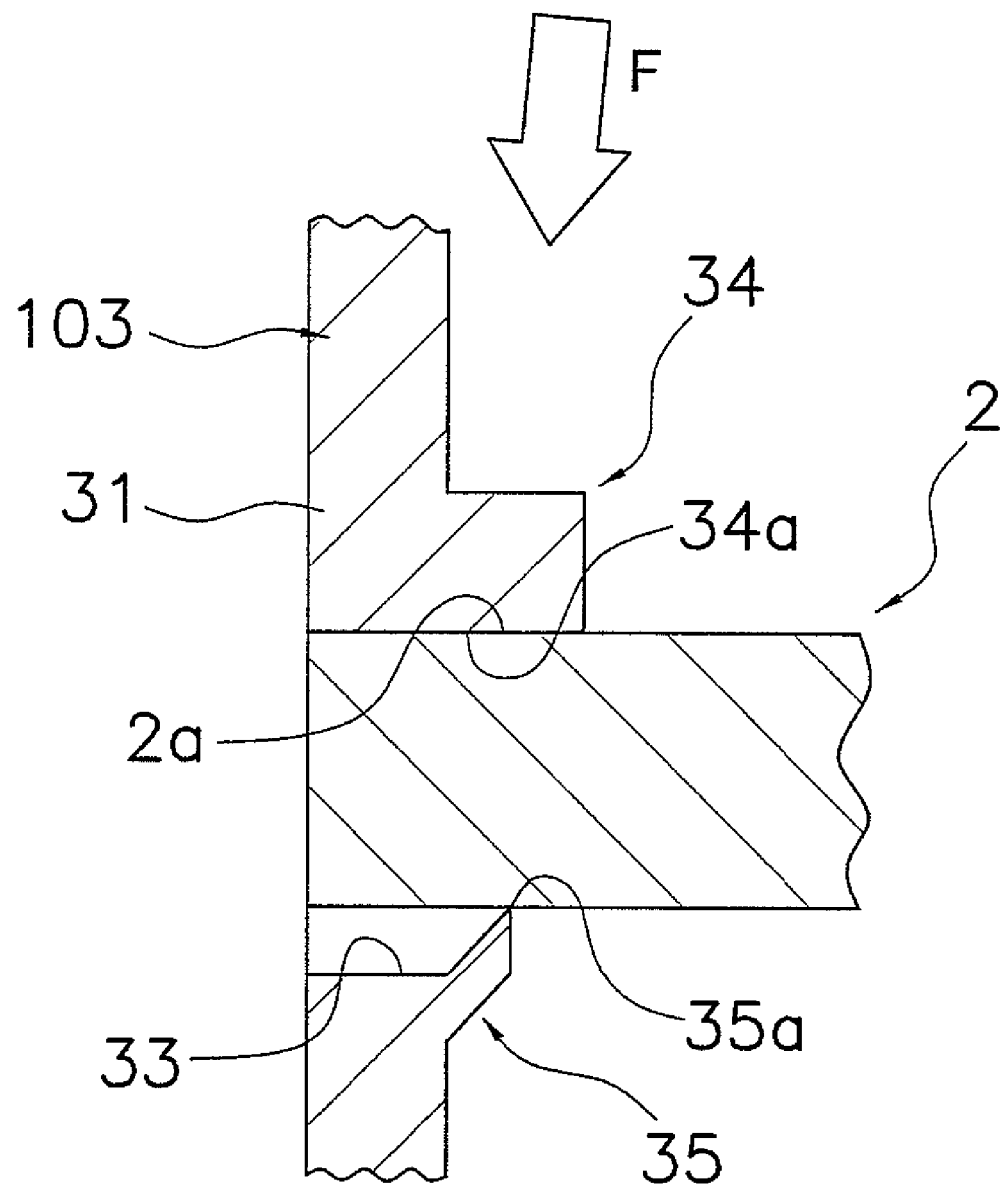
FIG. 16 is a cross sectional view taken along line E-E in FIG. 15.

As shown in FIGS. 15 and 16, as is the case with the first end plate 3 of the resin cross flow fan 1 in the first embodiment, the first end plate 103 is a member that supports an end of the plurality of blades 2 in the longitudinal direction, and includes the resin plate portion 31 having a circular disk shape, the axial portion 32 disposed at the center of the plate portion 31, the plurality of insertion portions 33 into which the plurality of blades 2 are inserted respectively, and the projecting portions 34 that project from the periphery of each insertion portion 33 in the direction of the rotational axis (specifically, toward the support plates 5).

Further, the first end plate 103 has pressing portions 35 formed thereon for pressing the blades 2 toward the projecting portions 34 in a state in which the blades 2 are inserted into the insertion portions 33. The pressing portions 35 are pawl portions that become elastically deformed such that portions 35*a* that come into contact with the blades 2 can move closer to or away from the projecting portions 34. More specifically, each pressing portion 35 is formed at a position facing the concave side of the blade 2 within the periphery of the insertion portion 33 so as to press the concave portion of the periphery of the blade 2 toward the projecting portion 34. The pressing portions 35 are inclined to the concave side of the blades 2 and also project from the periphery of the insertion portions 33 in the direction of the rotational axis (specifically, toward the support plates 5). Further, the plurality of blades 2 (specifically, the welding surfaces 2*a*) are fixed to these projecting portions 34 (specifically, the welding surfaces 34*a*) by laser welding. More specifically, the portions where the projecting portions 34 overlap with the blades 2 when viewing the circumferential space between the blades 2 are irradiated with a laser in the direction from the outer circumference of the first end plate 103 to the projecting portions 34, and thereby the welding surfaces 34*a* of the projecting portions 34 are welded to the welding surfaces 2*a* of the blades 2 (see arrows F in FIGS. 15 and 16). At this time, the pressing portions 35 press the blades 2 (specifically, the welding surfaces 2*a*) toward the projecting portions 34 (specifically, the welding surfaces 34*a*) in order to achieve a close contact between the blades 2 and the projecting portions 34. As the material constituting the first end plate 103, a material similar to that of the first end plate 3 of the resin cross flow fan 1 in the first embodiment can be used. Note that FIG. 15 is a cross sectional view taken along line C-C in FIG. 14 and is an enlarged view of only a portion of the first end plate 103. FIG. 16 is a cross sectional view taken along line E-E in FIG. 15.

Figure 17:
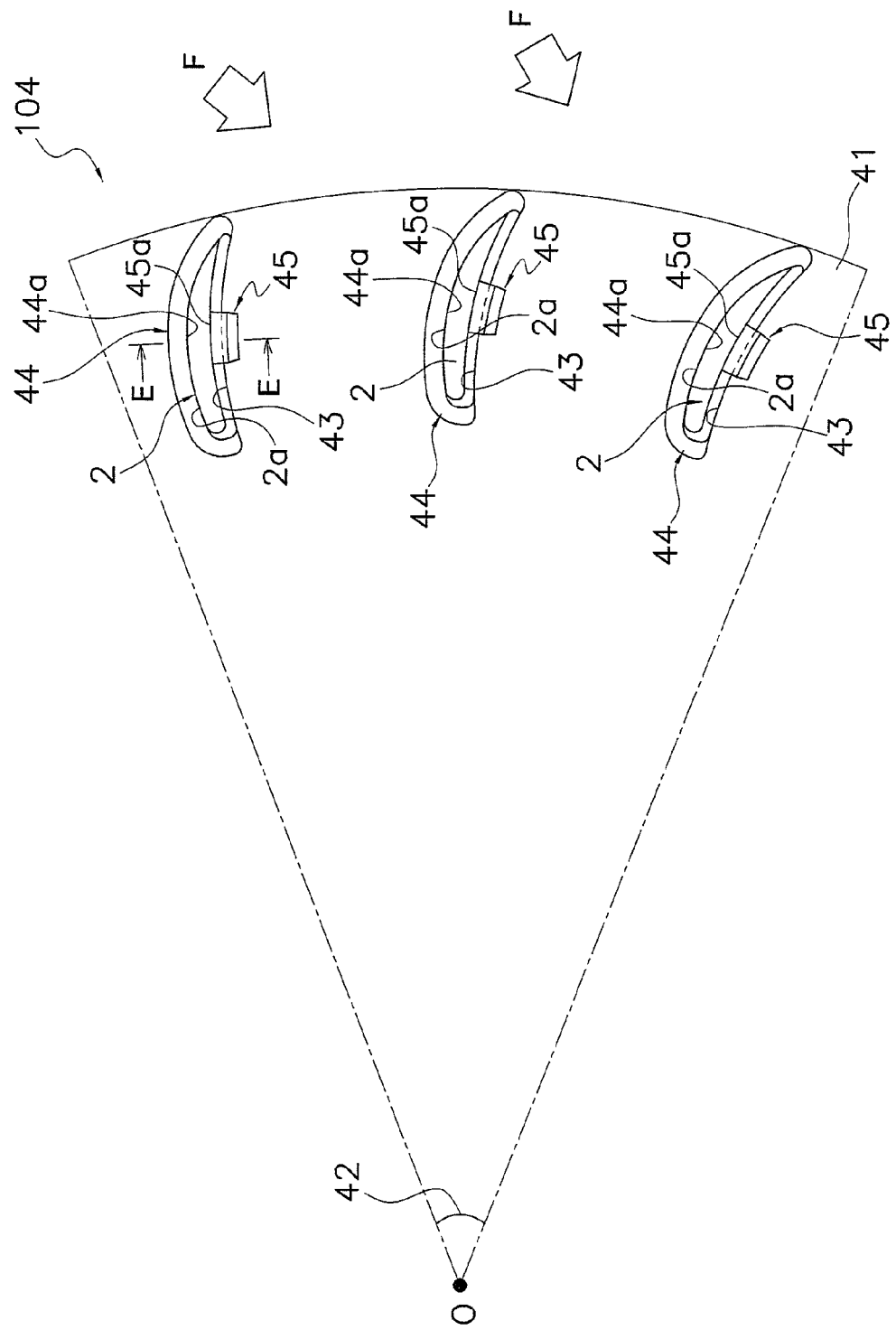
FIG. 17 is a view along arrow D in FIG. 14 and is an enlarged view of only a portion of a second end plate of the resin cross flow fan according to the second embodiment.
Figure 18:
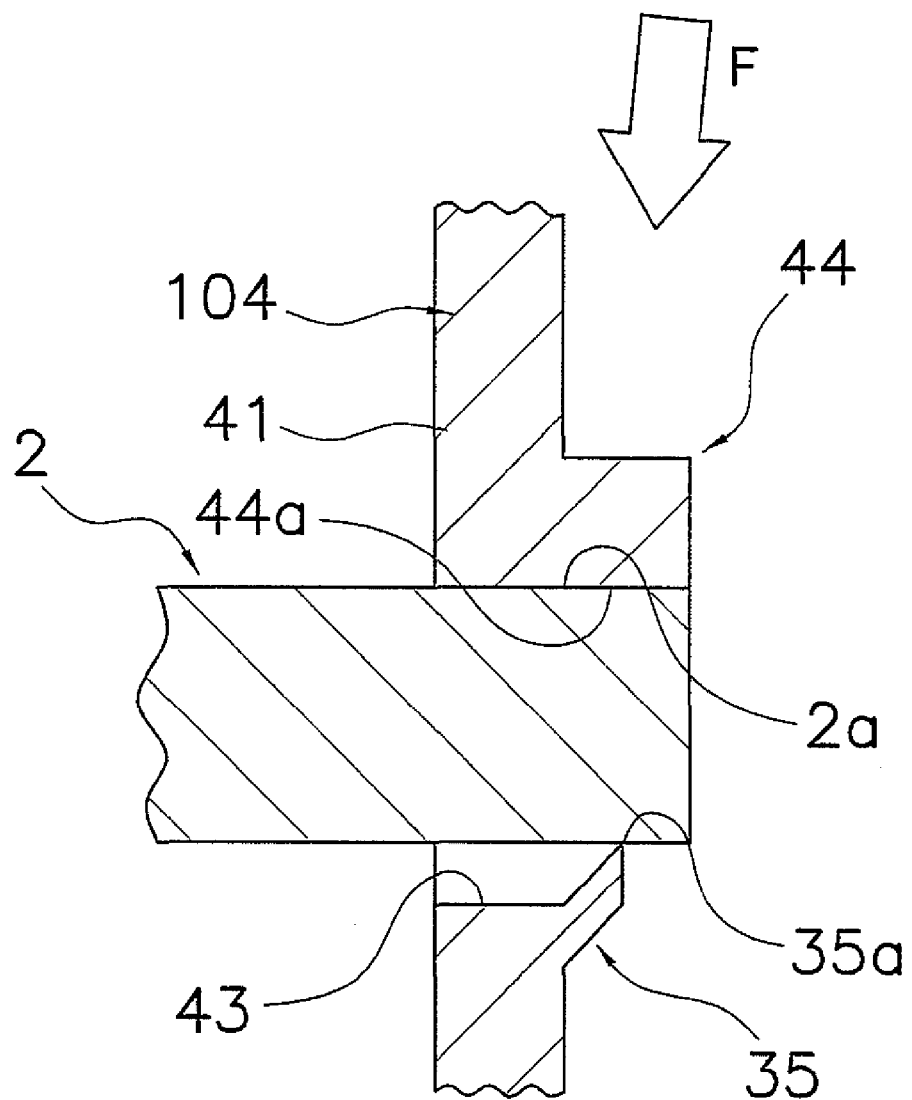
FIG. 18 is a cross sectional view taken along line E-E in FIG. 17.

As shown in FIGS. 17 and 18, as is the case with the second end plate 4 of the resin cross flow fan 1 in the first embodiment, the second end plate 104 is a member that supports the other end (end portion on the side opposite from the first end plate 103) of the plurality of blades 2 in the longitudinal direction, and includes the resin plate portion 41 having a circular disk shape, the axial portion 42 disposed at the center of the plate portion 41, the plurality of insertion portions 43 into which the plurality of blades 2 are inserted respectively, and the projecting portions 44 that project from the periphery of each insertion portion 43 in the direction of the rotational axis (specifically, toward the axial portion 61).

Further, as is the case with the first end plate 103, the second end plate 104 has pressing portions 45 formed thereon for pressing the blades 2 toward the projecting portions 44 in a state in which the blades 2 are inserted into the insertion portions 43. The pressing portions 45 are pawl portions that become elastically deformed such that portions 45*a* that come into contact with the blades 2 can move closer to or away from the projecting portions 44. More specifically, each pressing portion 45 is formed at a position facing the concave side of the blade 2 within the periphery of the insertion portion 43 so as to press the concave portion of the periphery of the blade 2 toward the projecting portion 44. The pressing portions 45 are inclined to the concave side of the blades 2 and also project from the periphery of the insertion portions 43 in the direction of the rotational axis (specifically, toward the axial portion 42). Further, the plurality of blades 2 (specifically, the welding surfaces 2a) are fixed to these projecting portions 44 (specifically, the welding surfaces 44a) by laser welding. More specifically, the portions where the projecting portions 44 overlap with the blades 2 when viewing the circumferential space between the blades 2 are irradiated with a laser in the direction from the outer circumference of the second end plate 104 to the projecting portions 44, and thereby the welding surfaces 44a of the projecting portions 44 are welded to the welding surfaces 2a of the blades 2 (see arrows F in FIGS. 17 and 18). At this time, the pressing portions 45 press the blades 2 (specifically, the welding surfaces 2a) toward the projecting portions 44 (specifically, the welding surfaces 44a) in order to achieve a close contact between the blades 2 and the projecting portions 44. As the material constituting the second end plate 104, a material similar to that of the second end plate 4 of the resin cross flow fan 1 in the first embodiment can be used. Note that FIG. 17 is a view along arrow D in FIG. 14 and is an enlarged view of only a portion of the second end plate 104. FIG. 18 is a cross sectional view taken along line E-E in FIG. 17.

Figure 19:
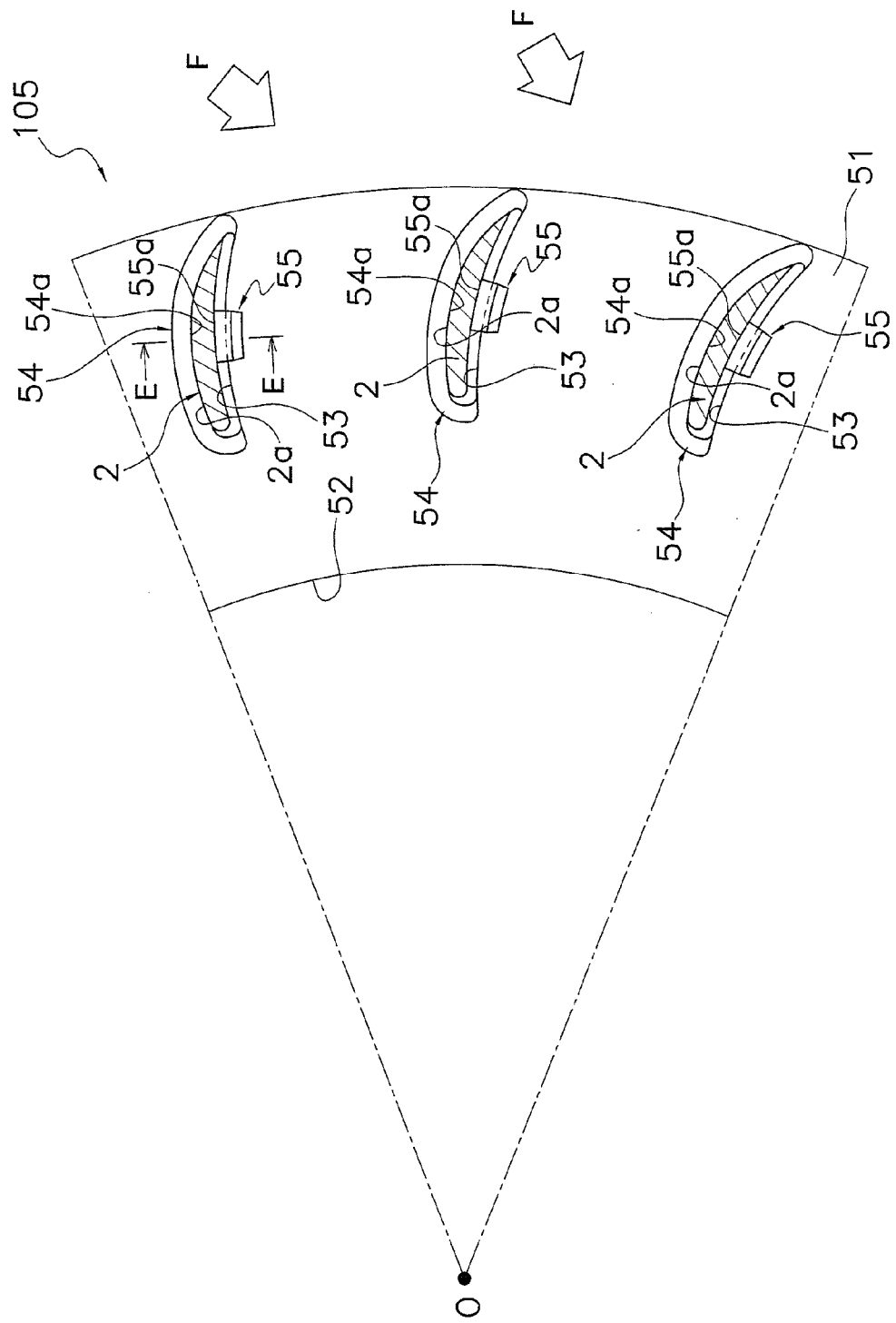
FIG. 19 is a cross sectional view taken along line C-C in FIG. 14 and is an enlarged view of only a portion of a support plate of the resin cross flow fan according to the second embodiment.
Figure 20:
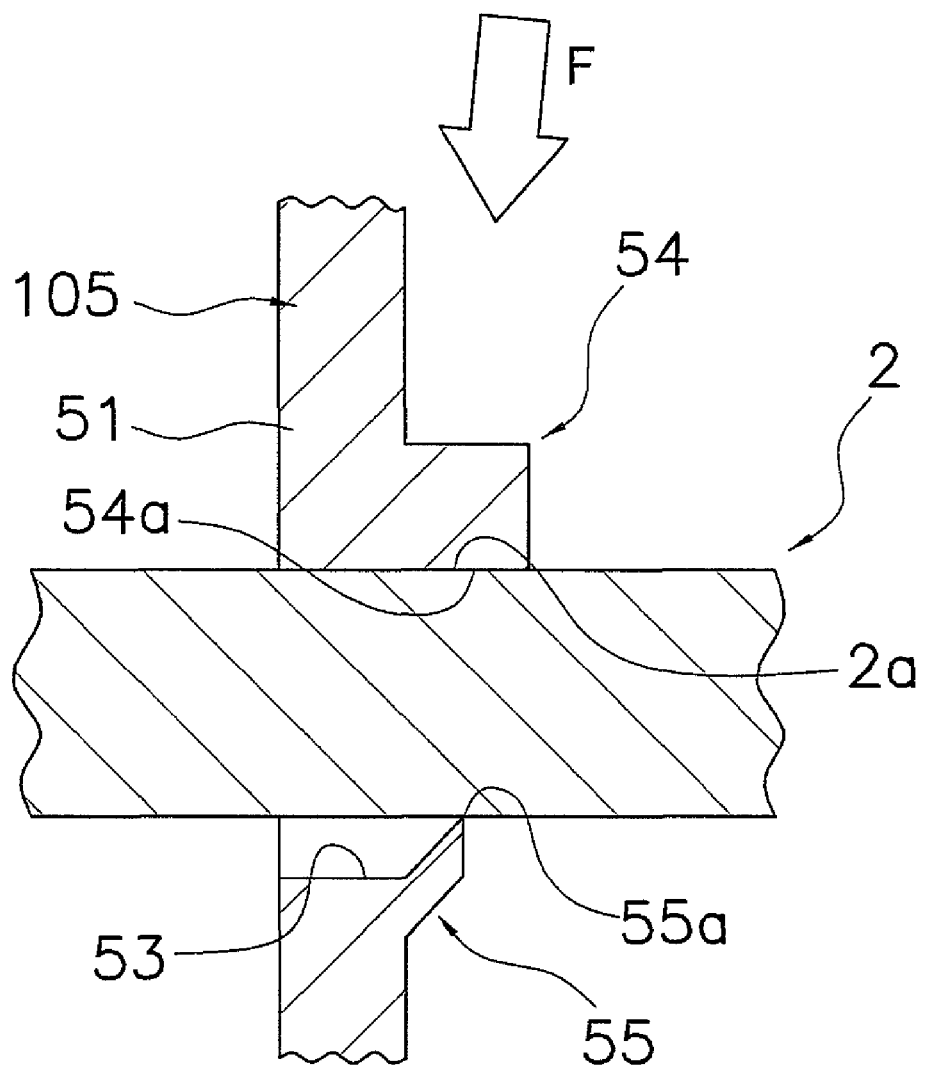
FIG. 20 is a cross sectional view taken along line E-E in FIG. 19.

The support plates 105 are members that constitute a middle portion of the resin cross flow fan 101 in a longitudinal direction. Here, four support plates 105 are disposed spaced apart between the first end plate 103 and the second end plate 104 (see FIG. 14). As shown in FIGS. 19 and 20, as is the case with the support plates 5 of the resin cross flow fan 1 in the first embodiment, each support plate 105 includes the resin plate portion 51 having a circular disk shape, the circular shaped opening 52 formed in the plate portion 51 at a position inside of the inner circumference of the plurality of blades 2, the plurality of insertion portions 53 into which the plurality of blades 2 are inserted respectively, and the projecting portions 54 that project from the periphery of each insertion portion 53 in the direction of the rotational axis (specifically, toward the second end plate 104).

Further, as is the case with the first end plate 103, the support plates 105 have pressing portions 55 formed thereon for pressing the blades 2 toward the projecting portions 54 in a state in which the blades 2 are inserted into the insertion portions 53. The pressing portions 55 are pawl portions that become elastically deformed such that portions 55a that come into contact with the blades 2 can move closer to or away from the projecting portions 54. More specifically, each pressing portion 55 is formed at a position facing the concave side of the blade 2 within the periphery of the insertion portions 53 so as to press the concave portion of the periphery of the blade 2 toward the projecting portion 54. The pressing portions 55 are inclined to the concave side of the blades 2 and also project from the periphery of the insertion portions 53 in the direction of the rotational axis (specifically, toward the second end plate 104). Further, the plurality of blades 2 (specifically, the welding surfaces 2a) are fixed to these projecting portions 54 (specifically, the welding surfaces 54a) by laser welding. More specifically, the portions where the projecting portions 54 overlap with the blades 2 when viewing the circumferential space between the blades 2 are irradiated with a laser in the direction from the outer circumference of the support plates 105 to the projecting portions 54, and thereby the welding surfaces 54a of the projecting portions 54 are welded to the welding surfaces 2a of the blades 2 (see arrows F in FIGS. 19 and 20). At this time, the pressing portions 55 press the blades 2 (specifically, the welding surfaces 2a) toward the projecting portions 54 (specifically, the welding surfaces 54a) in order to achieve a close contact between the blades 2 and the projecting portions 54. As the material constituting the support plates 105, a material similar to that of the support plates 5 of the resin cross flow fan 1 in the first embodiment can be used. Note that FIG. 19 is a cross sectional view taken along line C-C in FIG. 14 and is an enlarged view of only a portion of the support plates 105. FIG. 20 is a cross sectional view taken along line E-E in FIG. 19.

(2) Manufacturing Method of Resin Cross Flow Fan

Figure 21:
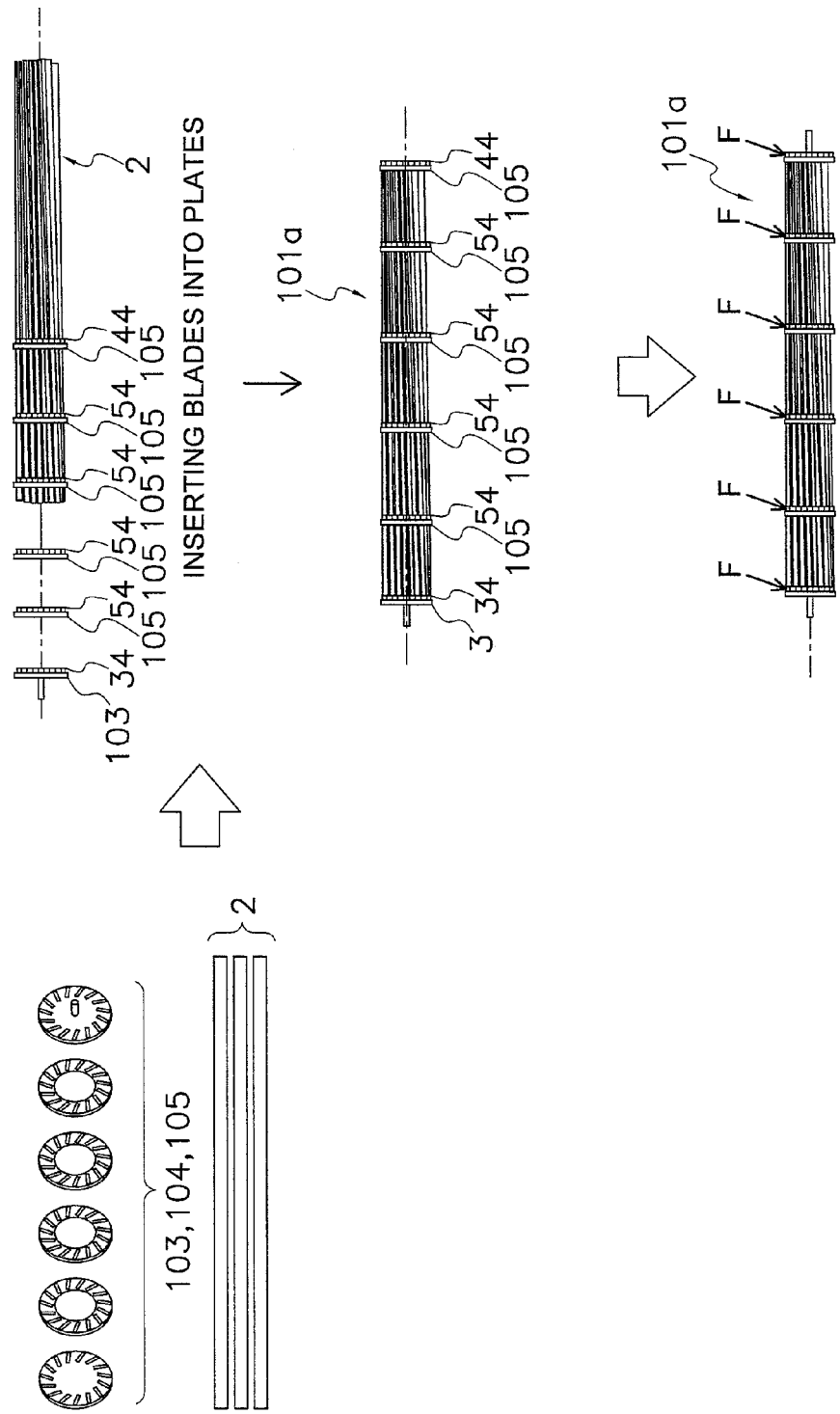
FIG. 21 is a view of a manufacturing step of the resin cross flow fan according to the second embodiment.

Next, a manufacturing method of the above described resin cross flow fan 101 is described with reference to FIGS. 14 and 15 to 21. Here, FIG. 21 is a view of a manufacturing step of the resin cross flow fan 101.

The manufacturing method of the resin cross flow fan 101 mainly includes a providing step, an assembling step, and a welding step.

The providing step is a step in which the plurality of blades 2 and the plates 103, 104, and 105 serving as the plurality of circular disks are provided. Specifically, the plurality of blades 2 are obtained by a material continuously extruded from an extruder and cutting this extruded material into predetermined length. In addition, the plates 103, 104, and 105 are obtained by injection molding using a mold.

The assembling step is a step in which the plurality of blades 2 are inserted into the insertion portions 33, 43, and 53 of the plates 103, 104, and 105 and thereby the plurality of blades 2 are assembled onto the plates 103, 104, and 105 serving as the plurality of circular disks in order to obtain an assembly 101a before being subjected to laser welding. Specifically, the assembly 101a is obtained by inserting the plurality of blades 2 into the second end plate 104, the plurality of the support plates 105, and the first end plate 103 in that order and disposing each of the plates 103, 104, and 105 with a predetermined space therebetween in the direction of the rotational axis. Since the assembly 101a as described above is obtained, sections are formed where the projecting portions 34, 44, and 54 constituting part of the plates 103, 104, and 105 overlap with the blades 2 when viewing the circumferential space between the blades 2 from the outer circumference of the plates 103, 104, and 105. Here, the plates 103, 104, and 105 have the pressing portions 35, 45, and 55 formed thereon for pressing the blades 2 toward the projecting portions 34, 44, and 54 in a state in which the blades 2 are inserted into the insertion portions 33, 43, and 53. In other words, the blades 2 can be closely contacted with the projecting portions 34, 44, and 54 simply by inserting the blades 2 into the insertion portions 33, 43, and 53. This eliminates the need for the pressing jig 7 in the welding step described below, which is used in manufacturing the resin cross flow fan 1 in the first embodiment. Further, since the insertion portions 33 have a hole size slightly larger than the cross sectional size of the blades 2, it is possible to smoothly assemble the blades 2 onto the plates 103, 104, and 105 and to prevent the blades 2 and the plates 103, 104, and 105 from being deformed. Further, the pressing portions 35, 45, and 55 are the pawl portions that become elastically deformed such that the portions 35a, 45a, and 55a that come into contact with the blades 2 can move closer to or away from the projecting portions 34, 44, and 54. Thereby, an insertion movement of the blades 2 into the insertion portions 33, 43, and 53 is not easily interfered.

The welding step is a step in which the blades 2 are fixed to the projecting portions 34, 44, and 54 of the plates 103, 104, and 105 by laser welding. Specifically, a laser is irradiated in the direction from the outer circumference of the plates 103, 104, and 105 to the projecting portions 34, 44, and 54 of the assembly 101a, and thereby the welding surfaces 2a of the blades 2 are welded to the welding surfaces 34a, 44a, and 54a of the projecting portions 34, 44, and 54. At this time, as described above, since the pressing portions 35, 45, and 55 are formed on the plates 103, 104, and 105, a state in which the blades 2 are closely contacted with the projecting portions 34, 44, and 54 is already achieved in the assembling step. Accordingly, laser welding can be performed without using the pressing jig 7 used in manufacturing the resin cross flow fan 1 in the first embodiment. Here, as the material constituting the plates 103, 104, and 105, a material having a higher light transmittance than the material constituting the blades 2 is used. This enables laser welding of the blades 2 to the projecting portions 34, 44, and 54 from the direction of the projecting portions 34, 44, and 54. In addition, in this manufacturing method, just one side (i.e., the welding surfaces 2a constituting the convex portion of the blades 2) of the blades 2 is welded to the projecting portions 34, 44, and 54 on the circular disks. Therefore, it is possible to reduce the number of portions to be laser welded. Further, by rotating the assembly 101a, a laser can be sequentially irradiated to the projecting portions 34, 44, and 54 juxtaposed in the circumferential direction of the plates 103, 104, and 105. Therefore, it is possible to improve the operation efficiency in laser welding.

Further, after the welding step, the radial run-out of axis and balance are checked, and the resin cross flow fan 101 is completed.

(3) Characteristics of Resin Cross Flow Fan and Manufacturing Method Thereof

The resin cross flow fan 101 and the manufacturing method thereof in this embodiment have the following characteristics in addition to the characteristics of the resin cross flow fan 1 and the manufacturing method thereof in the first embodiment.

(A)

With the resin cross flow fan 101 in this embodiment, since the pressing portions 35, 45, and 55 are formed on the plates 103, 104, and 105 serving as the circular disks, the blades 2 can be closely contacted with the projecting portions 34, 44, and 54 simply by inserting the blades 2 into the insertion portions 33, 43, and 53. This eliminates the need for a jig (for example, the pressing jig 7 in the first embodiment) for pressing the blades 2 toward the projecting portions 34, 44, and 54 when performing laser welding in the welding step, and each blade 2 can be reliably welded.

(B)

In addition, the pressing portions 35, 45, and 55 are the pawl portions that become elastically deformed such that the portions 35a, 45a, and 55a that come into contact with the blades 2 can move closer to or away from the projecting portions 34, 44, and 54. Therefore, the portions that come into contact with the blades 2 move away from the projecting portions 34, 44, and 54, and thereby an insertion movement of the blades 2 into the insertion portions 33, 43, and 53 is not easily interfered. This enables smooth insertion of the blades 2 into the insertion portions 33, 43, and 53.

(4) Modified Example 1

Figure 22:
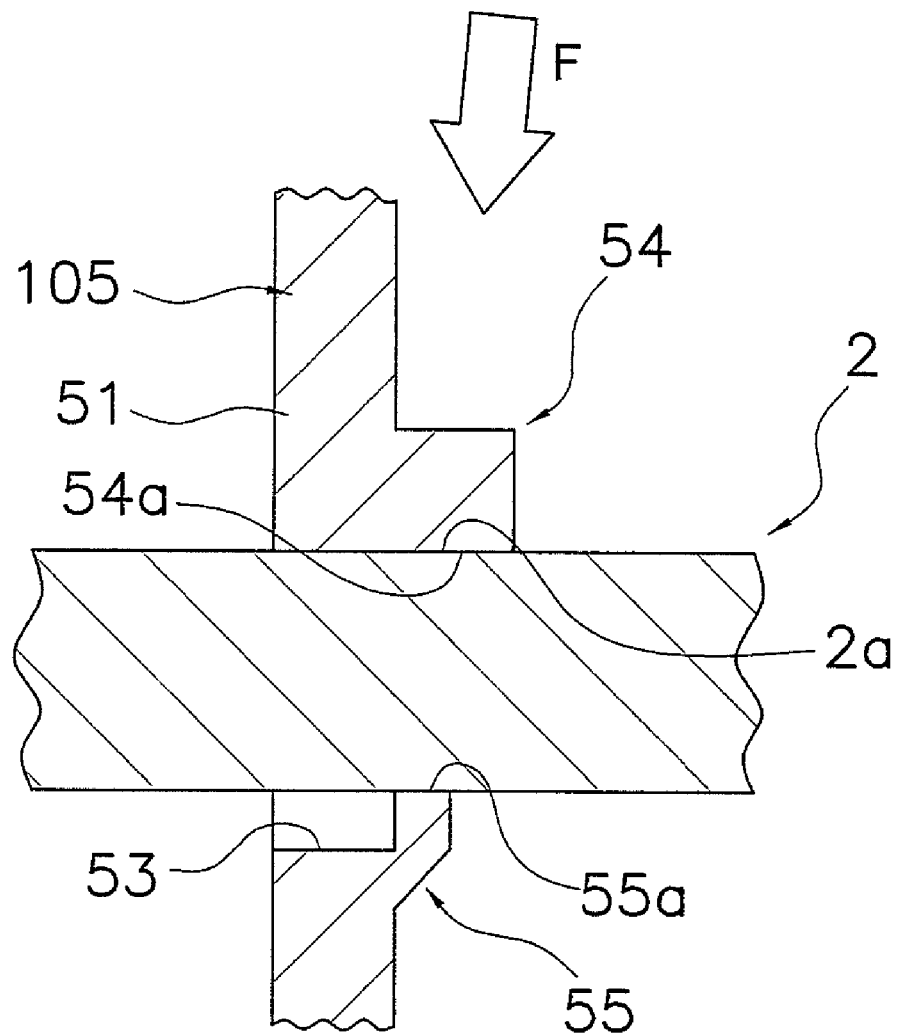
FIG. 22 is a view for describing a resin cross flow fan according to a modified example 1 of the second embodiment and corresponding to FIG. 20.

With the above described resin cross flow fan 101, as shown in FIGS. 16, 18, and 20, the portions 35a, 45a, and 55a of the pressing portions 35, 45, and 55, which come into contact with the concave side of the blades 2, have a slightly pointed shape, and the contact therebetween is substantially a line contact. However, they may be configured to extend along the concave side of the blades 2 such that the contact therebetween is a planer contact. More specifically, the support plates 105 are described by way of example (descriptions of the plates 103 and 104 are omitted). As shown in FIG. 22, the portions 55a of the pressing portions 55 are configured in a flat shape that extends along the concave side of the blades 2. This enables a further improvement of the close contact condition between the blades 2 and the projecting portions 34, 44, and 54 by the pressing portions 35, 45, and 55.

(5) Modified Example 2

Figure 23:
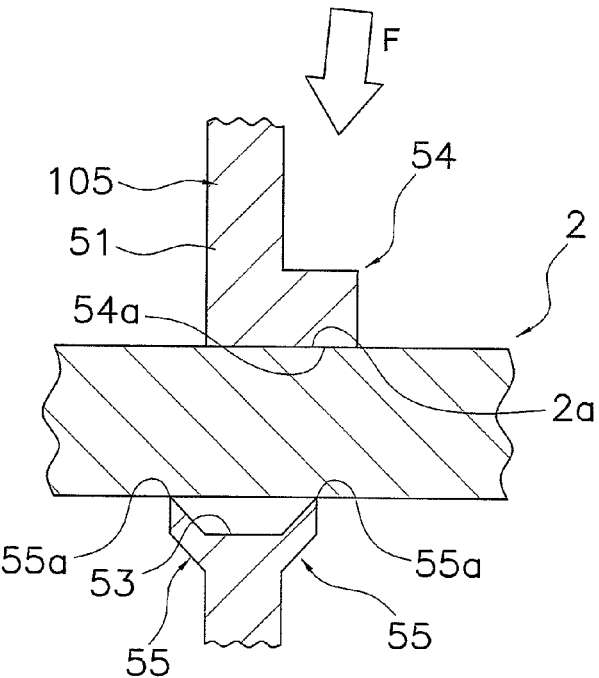
FIG. 23 is a view for describing a resin cross flow fan according to a modified example 2 of the second embodiment and corresponding to FIG. 20.

With the above described resin cross flow fan 101, as shown in FIGS. 16, 18, 20, and 22, the pressing portions 35, 45, and 55 are formed on the plates 103, 104, and 105 in one direction of the rotational axis (i.e., on one side), the pressing portions 35, 45, and 55 may be formed on the plates 103, 104, and 105 in both directions of the rotational axis (i.e., on both sides). More specifically, the support plates 105 are described by way of example (descriptions of the plates 103 and 104 are omitted). As shown in FIG. 23, the pressing portions 55 are formed on each support plate 105 so as to form not only the second end plate 104 but also the first end plate 103, in order to press the blades 2 toward the projecting portions 34 from both sides of each support plate 105. This enables a further improvement of the close contact condition between the blades 2 and the projecting portions 34, 44, and 54 by the pressing portions 35, 45, and 55.

(6) Modified Example 3

Figure 24:
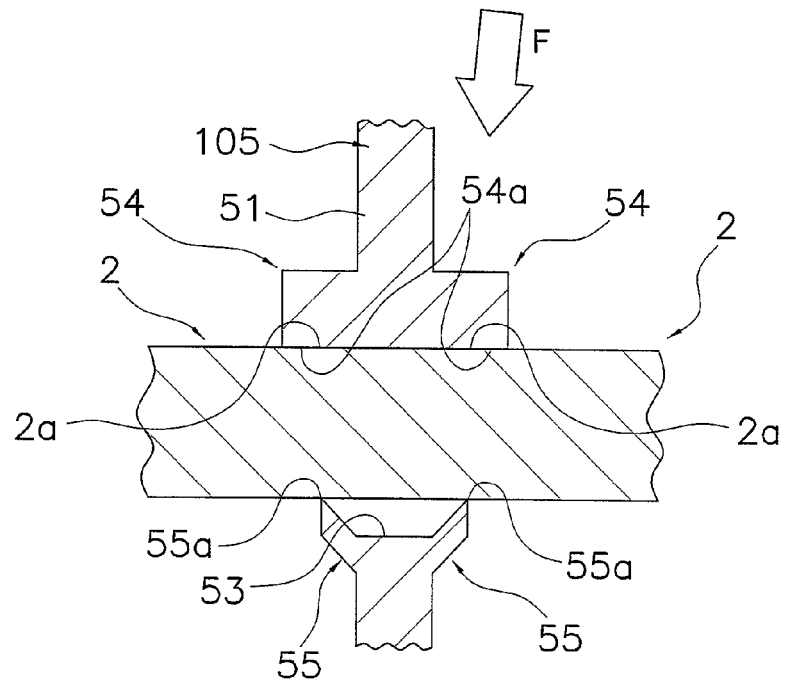
FIG. 24 is a view for describing a resin cross flow fan according to a modified example 3 of the second embodiment and corresponding to FIG. 20.

With the above described resin cross flow fan 101 shown in FIG. 22, the pressing portions 35, 45, and 55 are formed on the plates 103, 104, and 105 in both directions of the rotational axis (i.e., on both sides), and the projecting portions 34, 44, and 54 project from the plates 103, 104, and 105 in one direction of the rotational axis (i.e., toward one side). Further, as shown in FIG. 24, the projecting portions 34, 44, and 54 may project from the plates 103, 104, and 105 in both directions of the rotational axis (i.e., toward both sides). This enables a further improvement of the close contact condition between the blades 2 and the projecting portions 34, 44, and 54 by the pressing portions 35, 45, and 55. In addition, the blades 2 are more securely fixed to the projecting portions 34, 44, and 54.

(7) Modified Example 4

Figure 25:
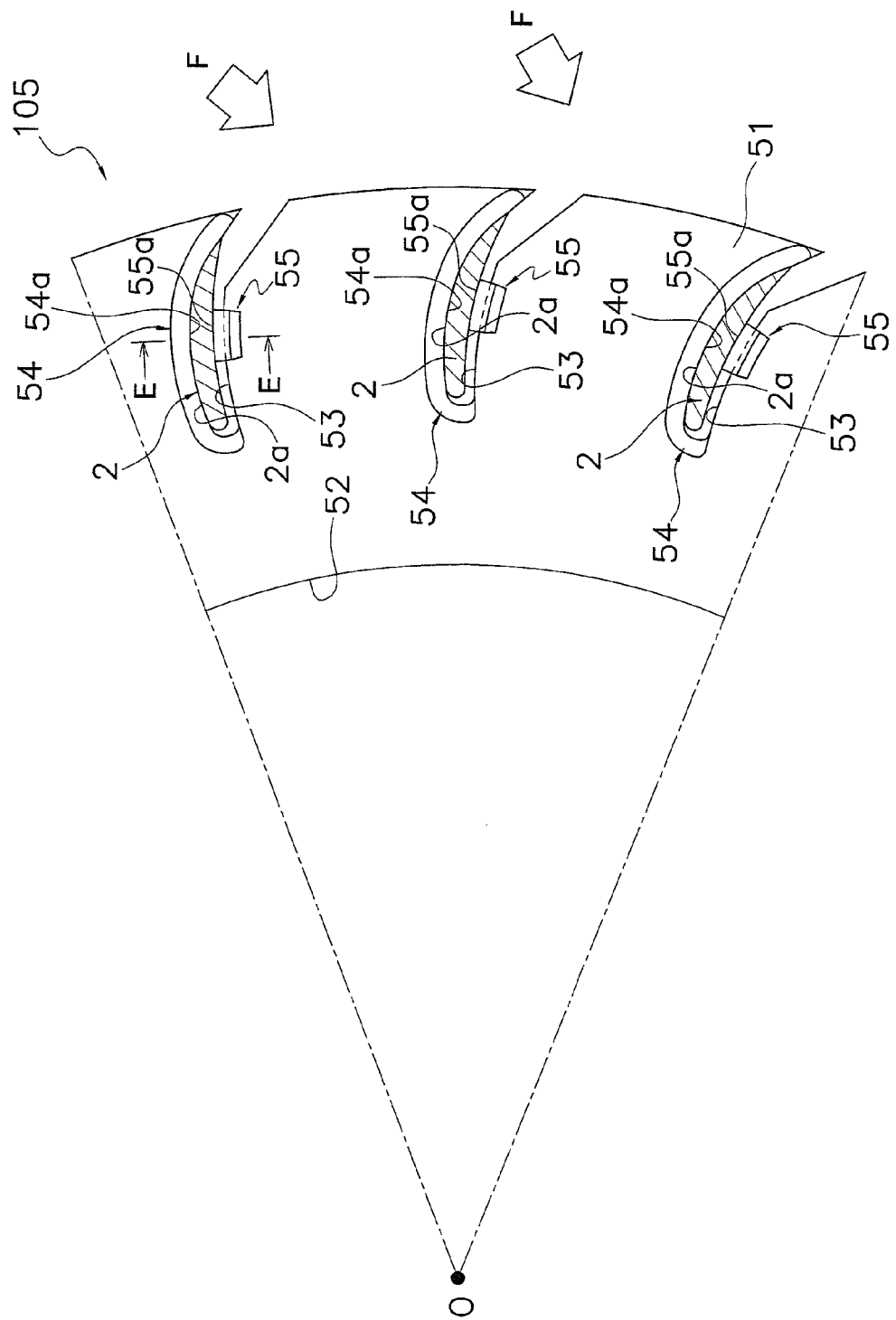
FIG. 25 is a view for describing a resin cross flow fan according to a modified example 4 of the second embodiment and corresponding to FIG. 19.

With the above described resin cross flow fan 101, as shown in FIGS. 15, 17, and 19, the insertion portions 33, 43, and 53 are the through holes. However, the insertion portions 33, 43, and 53 may be cutout grooves that extend to the outer circumferential edge of the plate portions 31, 41, and 51. More specifically, the support plates 105 are described by way of example (descriptions of the plates 103 and 104 are omitted). As shown in FIG. 25, the insertion portions 53 are formed to be cutout grooves that extend to the outer circumferential edge of the plate portion 51. This enables insertion of the blades 2 into the insertion portions 33, 43, and 53 from the outer circumferential edge of the plates 103, 104, and 105.

Other Embodiments

While selected embodiments of the present invention have been described with reference to the drawings, the scope of the invention is not limited to these embodiments, and various changes and modifications can be made herein without departing from the scope of the invention.

For example, in the above described embodiment, the projecting portions 34, 44, and 54 are formed so as to extend substantially the entire convex portion of the blades 2, however, they may extend along only a portion of the same.

INDUSTRIAL APPLICABILITY

Application of the present invention can provide a resin cross flow fan and a manufacturing method thereof in which an annealing step can be omitted and the number of circular disks can be reduced, and which provides improved fan strength and air blowing performance.

What is claimed is:

1. A resin cross flow fan comprising:
    a plurality of blades annually disposed about a rotation axis; and
    a plurality of circular disks disposed spaced apart in a direction of the rotation axis, the circular disks being including
        insertion portions, each of the insertion portions having a hole or a groove into which each of the blades is inserted, and
        projecting portions projecting from a periphery of the insertion portions in the direction of the rotation axis, each of the projecting portions being formed so as to extend along one circumferential side of one of the insertion portions, and each of the blades being fixed to the projecting portions by laser welding,
        pressing portions arranged to press the blades circumferentially toward the projecting portions in a state in which the blades are inserted into the insertion portions, with the pressing portions being arranged on opposite circumferential sides of the insertion openings from the projecting portions to circumferentially press the blades toward the projecting portions.

2. The resin cross flow fan according to claim 1, wherein the pressing portions are pawl portions configured to become elastically deformed such that portions thereof that come into contact with the blades can move closer to or away from the projecting portions.

3. A resin cross flow fan comprising:
    a plurality of blades annually disposed about a rotation axis;
    a plurality of circular disks disposed spaced apart in a direction of the rotation axis, the circular disks including
        insertion portions, each of the insertion portions having a hole or a groove into which each of the blades is inserted, and
        projecting portions projecting from a periphery of the insertion portions in the direction of the rotation axis, each of the blades being fixed to the projecting portions by laser welding, with
    a material of the circular disks having a higher light transmittance than a material of the blades.

4. The resin cross flow fan according to claim 3, wherein the projecting portions are formed so as to extend along one side of the blades.

5. A method of manufacturing a resin cross flow fan, comprising:
    providing a plurality of blades and a plurality of circular disks, the circular disks having insertion portions, each of the insertion portions having a hole or groove into which each of the blades are inserted, and projecting portions projecting from a periphery of the insertion portions along a direction of thickness;
    assembling the blades onto the circular disks by inserting the blades into the insertion portions; and
    welding the blades to the projecting portions by laser welding.

6. The method according to claim 5, wherein the assembling of the blades further includes inserting the blades into the insertion portions so that the blades are pressed toward the projecting portions, and the circular disks further having pressing portions formed thereon for pressing the blades toward the projecting portions in a state in which the blades are inserted into the insertion portions.

7. The method according to claim 5, wherein the welding of the blades further includes subjecting one side of the blades to laser welding, and the projecting portions being formed so as to extend along one side of the blades.

* * * * *

UNITED STATES PATENT AND TRADEMARK OFFICE
CERTIFICATE OF CORRECTION

Page 1 of 1

PATENT NO. : 8,092,181 B2
APPLICATION NO. : 11/997724
DATED : January 10, 2012
INVENTOR(S) : Hisanori Nishino It is certified that error appears in the above-identified patent and that said Letters Patent is hereby corrected as shown below:

Title Page, below Item (22)

Please add

-- (30)　　　Foreign Application Priority Data

August 5, 2005　　(JP) ............... 2005-227700 --

Signed and Sealed this
Tenth Day of April, 2012

David J. Kappos
*Director of the United States Patent and Trademark Office*